United States Patent [19]

Reuscher et al.

[11] Patent Number: 5,728,823
[45] Date of Patent: Mar. 17, 1998

[54] CYCLODEXTRIN DERIVATIVES HAVING AT LEAST ONE NITROGEN-CONTAINING HETEROCYCLE, THEIR PREPARATION AND USE

[75] Inventors: Helmut Reuscher, Emmerting; Rolf Hirsenkorn, München; Wolfgang Haas, Altoetting, all of Germany

[73] Assignee: Consortium für elektrochemische Industrie GmbH, München, Germany

[21] Appl. No.: 512,653

[22] Filed: Aug. 8, 1995

[30] Foreign Application Priority Data

Aug. 18, 1994 [DE] Germany ............ 44 29 229.5

[51] Int. Cl.$^6$ ............ C08B 30/18; C08B 37/16; A61K 31/715
[52] U.S. Cl. ............ 536/46; 536/103; 514/58
[58] Field of Search ............ 536/46, 103; 514/58

[56] References Cited

U.S. PATENT DOCUMENTS

| | | | |
|---|---|---|---|
| 3,453,257 | 7/1969 | Parmerter et al. | 536/46 |
| 5,134,127 | 7/1992 | Stella et al. | 514/58 |
| 5,389,651 | 2/1995 | Henrick | 514/345 |

FOREIGN PATENT DOCUMENTS 0483380  5/1992  European Pat. Off.

OTHER PUBLICATIONS

B. Pöpping, A. Deratani, Makromol. Chem., Rapid Commun. 13, 237–241 (1992) "Synthesis of cyclodextrins with pendant chlorinated groups. Reaction of β–cyclodextrin with epichlorohydrin in acidic medium".

K.G.–Kleb, E. Siegel, K. Sasse, Angew. Chem. Int. Ed. Engl. 3, 408 (1964), No. 6 "New Reactive Dyes".

Ullman's Encyclopedia of Industrial Chemistry, 5th edition, vol. A 22, p. 662 Reactive Dyes.

J. Chem. Soc. Perkin Trans. 2, 1992, Kazuo Taguchi, "Transient Binding Mode of Phenolphthalein–β–Cyclodextrin Complex: The Lactone Dianion an Induced Transition–state Analogue Trapped in β–Cyclodextrin".

H. Fikentscher, Cellulosechemie 13 (1932), 58–64, "Systematik der Cellulosen auf Grund ihrer Viskosität in Lösung".

Tetrahedron Letters vol. 21, pp. 2721–2724, Pergamon Press Ltd., 1980, GB M. Kojima et al., "The Cyclodextrin–nicotinamide compound as a dehydrogenase model simulating apoenzyme–substrate ternary complex system".

K.G. Kleb, E. Siegel, K. Sasse, Angew. Chem. 76, 423 (1964).

Primary Examiner—John Kight
Assistant Examiner—Everett White
Attorney, Agent, or Firm—Collard & Roe, P.C.

[57] ABSTRACT

Reactive cyclodextrin derivatives have at least one nitrogen-containing heterocycle. The reactive cyclodextrin derivatives include at least one nitrogen-containing heterocycle having at least one electrophilic center.

16 Claims, No Drawings

CYCLODEXTRIN DERIVATIVES HAVING AT LEAST ONE NITROGEN-CONTAINING HETEROCYCLE, THEIR PREPARATION AND USE

BACKGROUND OF THE INVENTION

1. Field of the Invention

The present invention relates to reactive cyclodextrin derivatives having at least one nitrogen-containing heterocycle, their preparation and use.

2. The Prior Art

A number of reactive cyclodextrin derivatives and processes for their preparation are already known. EP-A-483380 of Toppan Printing thus describes a method for the preparation of cyclodextrin-containing polymers, in which aldehyde groups are introduced in protected or unprotected form into the cyclodextrin, which groups then react with the nucleophilic hydroxyl groups of a polymer. The bonding of cyclodextrins to polymers via an acetal bond, as described in the Patent Application EP-A-483380, is not advantageous because of the known lability of acetyls under acidic conditions.

A. Deratani and B. Popping (Makromol. Chem., Rapid Commun. 13, 237–41 (1992)) describe the preparation of a cyclodextrin chlorohydrin (3-chloro-2-hydroxypropyl-cyclodextrin derivative) by reaction of β-cyclodextrin in an aqueous medium with epichlorohydrin under Lewis acid conditions using $Zn(BF_4)_2$ as a catalyst. Under basic conditions, this derivative is able to react with nucleophiles such as e.g. $OH^-$ ions (sodium hydroxide solution). Disadvantageously, in the reaction of cyclodextrin with epichlorohydrin under Lewis acid conditions only a very small incorporation of epichlorohydrin was achieved. The reaction therefore had to be carried out using a very high excess of epichlorohydrin, which unavoidably leads to a large amount of extremely toxic or carcinogenic by-products, which have to be separated off and destroyed.

SUMMARY OF THE INVENTION

The invention relates to reactive cyclodextrin derivatives which contain at least one nitrogen-containing heterocycle having at least one electrophilic center.

The nitrogen-containing heterocycle preferably comprises one to 3 electrophilic centers.

The electrophilic centers can be identical or different and are carbon atoms to which halogen, in particular F or Cl, or an ammonium substituent, in particular trialkylammonium, or a substituted or unsubstituted pyridinium substituent, is covalently bonded.

The substituent distribution of the substituents according to the invention on the cyclodextrin is preferably unselective.

The cyclodextrin derivatives according to the invention preferably comply with the following formula I:

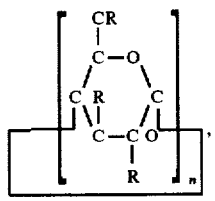

where R is OH or $OR^1$ or $R^2$ and $R^1$ is a hydrophilic radical which can be identical or different and $R^2$ is a nitrogen-containing heterocycle which is either linked directly or via a spacer by means of an ether, thioether, ester or amine bond, where the spacer is an alkyl or hydroxyalkyl radical having 1–12 carbon atoms, which is bonded to the anhydroglucose via an ether, thioether, ester or amine bond and the nitrogen-containing heterocycle includes at least one halogen or one ammonium substituent and is present at least once per cyclodextrin and n is 6, 7 or 8.

$R^1$ is preferably identical or different and is methyl, ethyl, n-propyl or i-propyl, n-butyl or i-butyl, $C_2$–$C_6$-hydroxyalkyl such as hydroxyethyl, hydroxy-i-propyl, hydroxy-n-propyl, $C_3$–$C_6$-oligohydroxyalkyl such as dihydroxy-i-propyl, dihydroxy-n-propyl, $C_1$–$C_4$-carboxyalkyl (in the form of the free acid or as an alkali metal salt) such as, for example, carboxymethyl, carboxyethyl, carboxy-i-propyl, carboxy-n-propyl or an alkali metal salt of said carboxyalkyl substituents, acetyl, propionyl, butyryl, sulfate, $C_1$–$C_4$-sulfonylalkyl (in the form of the free acid or as an alkali metal salt), $C_2$–$C_4$-carboxyhydroxyalkyl (in the form of the free acid or as an alkali metal salt), $C_2$–$C_4$-sulfonylhydroxyalkyl (in the form of the free acid or as an alkali metal salt) and oxalyl, malonyl, succinyl, glutaryl or adipyl (in the form of the free acid or as an alkali metal salt).

$R^2$ is preferably identical or different and is $-R^3_m-(CHR^4)-R^5-R^6$, where $R^3$ is identical or different and is O,

S, NH, or $NR^7$ and $R^7$ is identical or different and is $C_1$–$C_6$-alkyl and $R^4$ is identical or different and is H or OH and $R^5$ is NH, $NR^7$, S, O or

particularly preferably O, and $R^6$ if $R^5$ is NH, $NR^7$, S or O is either

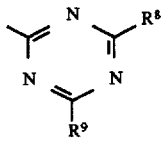

where $R^8$ and $R^9$ are identical or different and are halogen, preferably Cl or F, or $R^8$ is $NR^{10}R^{11}$, OH, Oalkali metal, $OR^7$, $O(i-C_3H_6)$, $OCH_2CH_2OCH_3$ or $SO_3H$ and $R^9$ is halogen, in particular Cl or F, or an ammonium substituent, in particular trialkylammonium, or substituted or unsubstituted pyridinium substituents, such as e.g.

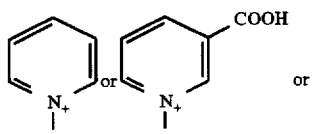

or

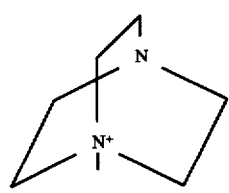

or —N⁺(C₁–C₆alkyl)₃ and

R¹⁰ is hydrogen or an aliphatic radical, preferably a C₁–C₄-alkyl radical which can be substituted by OCH₃, OC₂H₅, COOH, OSO₃H, SO₃H, OCH₂CH₂SO₂CH₂CH₂OSO₃H, OCH₂CH₂SO₂CH=CH₂, OCH₂CH₂SO₂CH₂CH₂Cl, SO₂CH₂CH₂OSO₃H, SO₂CH=CH₂, or a cycloaliphatic radical, preferably a 5- to 6-membered cycloalkyl radical, or araliphatic radical, preferably radicals of the formula

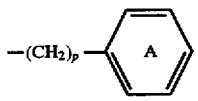

where p=1–4 and the radical A can be substituted, for example, by Cl, NO₂, COOH, SO₃H, CH₃, OCH₃, SO₂CH₂CH₂OSO₃H, SO₂CH=CH₂, CH₂SO₂CH₂CH₂OSO₃H, CH₂SO₂CH=CH₂, and R¹¹ has the meanings mentioned for R¹⁰ or is a phenyl radical or substituted phenyl radical, preferably a phenyl radical substituted by Cl, NO₂, COOH, SO₃H, CH₃, OCH₃, SO₂CH₂CH₂OSO₃H, SO₂CH=CH₂, CH₂SO₂CH₂CH₂OSO₃H, CH₂SO₂CH=CH₂, or R⁶ is

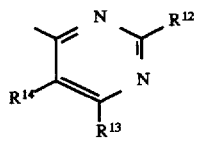

where

R¹², R¹³ and R¹⁴ are identical or different and are halogen, preferably Cl or F, or R⁶, if R⁵

OC, is

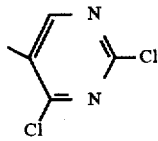

or

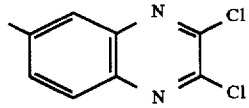

and o is an integer from 0 to 12 and m is 0 or 1, where for o=0, m=0 also applies.

Particularly preferred cyclodextrin derivatives according to the invention are 2,4-dichloro-1,3,5-triazinylcyclodextrins, 2-chloro-4-hydroxy-1,3,5-triazinylcyclodextrins (sodium salts), 2-fluoro-4-hydroxy-1,3,5-triazinylcyclodextrins (sodium salts), 2,4,5-trichloropyrimidylcyclodextrins, 5-chloro-2,4-difluoropyrimidyl-cyclodextrins, 6-(2,3-dichloro)quinoxalinylcyclodextrins, 5-(2,4-dichloro)pyrimidinylcyclodextrins, 2-amino-4-chloro-1,3,5-triazinylcyclodextrins, 2-chloro-4-ethylamino-1,3,5-triazinylcyclodextrins, 2-chloro-4-diethylamino-1,3,5-triazinylcyclodextrins and 2-chloro-4-methoxy-1,3,5-triazinylcyclodextrins.

The invention further relates to processes for the preparation of the cyclodextrin derivatives according to the invention. The preparation is preferably carried out by means of a process which comprises reacting the native α-, β- and/or γ-cyclodextrin and/or a suitable α-, β- and/or γ-cyclodextrin derivative in a suitable reaction medium in the presence of an acid acceptor and optionally of a surface-active agent in weakly acidic to strongly basic medium at temperatures from −10° to +70° C. with suitable nitrogen-containing heterocycles and optionally subsequently working up in an otherwise known manner in the neutral or weakly basic range, optionally with the aid of a buffer.

The cyclodextrin derivative obtained can then be further purified, optionally by means of purification processes customary for cyclodextrin derivatives.

Using the process according to the invention, cyclodextrin derivatives having stable C—O, C—S or C—N bonds can be obtained, no toxic compounds occurring as in the known processes by reaction of cyclodextrin with epichlorohydrin. Thus, e.g. in the reaction of cyclodextrin with cyanuric chloride, only sodium chloride and toxicologically substantially more acceptable by-products are obtained.

Any desired cyclodextrins or cyclodextrin derivatives which have at least one free OH group/cyclodextrin molecule in at least one of the positions C2, C3 and/or C6 of the anhydroglucose are suitable for the process according to the invention. The cyclodextrin or cyclodextrin derivatives do not have to comply with any particular demands with respect to purity. They can be employed in commercially available quality having a water content of 0 to 16%.

Examples of cyclodextrin derivatives which are suitable for the preparation process according to the invention are cyclodextrin ethers or mixed ethers, cyclodextrin esters or mixed esters or mixed cyclodextrin/ether/ester derivatives, in particular said derivatives of β-cyclodextrin.

Hydrophilic cyclodextrin derivatives having the following substituents are particularly suitable:
a ($C_1$–$C_4$)-alkyl radical, preferably a methyl or ethyl radical, particularly preferably a methyl radical; a ($C_2$–$C_6$)-hydroxyalkyl radical, preferably a hydroxypropyl radical or a hydroxybutyl radical, particularly preferably a hydroxypropyl radical, a ($C_3$–$C_6$)-oligohydroxyalkyl radical, preferably $C_3$–$C_4$, particularly preferably a dihydroxypropyl radical, an acetyl radical, a propionyl radical, a butyryl radical, preferably an acetyl radical, or a propionyl radical, particularly preferably an acetyl radical.

Derivatives having an average degree of substitution per anhydroglucose (DS) of 0.3–2.0, particularly preferably of 0.6–1.8, are preferably suitable.

Ionic cyclodextrin derivatives having the following substituents are also preferably suitable: a carboxyalkyl radical in the form of the free acid or as an alkali metal salt, a sulfonylalkyl radical in the form of the free acid or as an alkali metal salt, a carboxyhydroxyalkyl radical in the form of the free acid or as an alkali metal salt, a sulfonylhydroxyalkyl radical in the form of the free acid or as an alkali metal salt, a ($C_1$–$C_4$)-alkyl radical, a ($C_2$–$C_4$)-hydroxyalkyl radical and a sulfate radical.

The average degree of substitution per anhydroglucose (DS) in these cyclodextrin derivatives is preferably 0.3–2.0, particularly preferably 0.4–1.5, in particular 0.4–0.6.

Ionic cyclodextrin derivatives having an oxalyl radical, malonyl radical, succinyl radical, glutaryl radical and/or adipyl radical as substituents, preferably having an average degree of substitution per anhydroglucose (DS) of 0.3 to 2.0, particularly preferably 0.4–1.5, in particular 0.4–0.8, are also preferably suitable.

The preparation of the suitable cyclodextrin derivatives is known from the literature.

For use in the process according to the invention, nitrogen-containing heterocycles having at least two electrophilic centers are suitable.

Examples of such heterocycles are 2,4,5,6-tetrachloropyrimidine, 2,4,6-trifluoro-5-chloropyrimidine (can be prepared from 2,4,5,6-tetrachloropyrimidine by halogen exchange); 2,4-dichloropyrimidine-5-carbonyl chloride (can be prepared according to methods known from the literature); 2,3-dichloroquinoxaline-6-carbonyl chloride (preparation according to K. G. Kleb, E. Siegel, K. Sasse, Angew. Chem. 76, 423 (1964); Angew. Chem. Int. Ed. Engl. 3, 408 (1964)), and the compounds of the formula II presented below

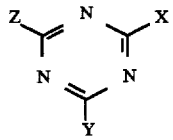 II where X and Y can be identical or different and are halogen, preferably F or Cl, and Z is halogen, preferably F or Cl, OH, OLi, ONa, OK, $OR^7$, $SR^7$ or $NR^{10}R^{11}$, where the radicals $R^7$ to $R^{11}$ have the meaning already mentioned.

Examples of compounds of the formula II are 2,4,6-trichloro-1,3,5-triazine; 2,4,6-trifluoro-1,3,5-triazine; 2-amino-4,6-dichloro-1,3,5-triazine; 2,4-dichloro-6-methoxy-1,3,5-triazine; 2,4-dichloro-6-hydroxy-1,3,5-triazine or the sodium salt of this compound, 2,4-dichloro-6-ethylamino-1,3,5-triazine, 2,4-dichloro-6-diethylamino-1,3,5-triazine.

These compounds are commercially available or obtainable by known or analogous processes from 2,4,6-trichloro-1,3,5-triazine by reaction with the appropriate nucleophiles. 2,4,6-Trichloro-1,3,5-triazine; 2,4,6-trifluoro-1,3,5-triazine; 2-amino-4,6-dichloro-1,3,5-triazine; 2,4-dichloro-6-methoxy-1,3,5-triazine; 2,4-dichloro-6-hydroxy-1,3,5-triazine, sodium salt; 2,4,5,6-tetrachloropyrimidine; 2,4,6-trifluoro-5-chloropyrimidine; 2,4-dichloropyrimidine-5-carbonyl chloride or 2,3-dichloroquinoxaline-6-carbonyl chloride, 2,4-dichloro-6-ethylamino-1,3,5-triazine and 2,4-dichloro-6-diethylamino-1,3,5-triazine are preferably employed.

DMF (dimethylformamide), DMSO (dimethyl sulfoxide), xylene, dioxane, acetone, methanol, ethanol, water, toluene, methyl ethyl ketone or mixtures of these substances are preferably suitable as a reaction medium for the process according to the invention.

In the reaction with 2,4,6-triaholo-1,3,5-triazines, preferably cyanuric chloride, the heterocycle should be present in finely disperse form, in the form of mixtures with organic solvents or in water, optionally with the addition of a surface-active agent as a wetting agent.

Water or a water/acetone mixture in a mixing ratio of 10:1 to 2:1 is particularly preferably used.

One or more substances selected from the group consisting of alkali metal hydroxides and alkaline earth metal hydroxides, alkali metal carbonates and alkaline earth metal carbonates, alkali metal hydrogen carbonates and alkaline earth metal hydrogen carbonates, alkali metal hydrogen phosphates, amines, tert-amines and pyridine are preferably suitable as acid acceptors in the process according to the invention.

NaOH, KOH, sodium carbonate, potassium carbonate, sodium hydrogen carbonate, potassium hydrogen carbonate, disodium hydrogen phosphate, dipotassium hydrogen phosphate, pyridine, triethylamine or collidine is particularly preferably employed.

The agents customary in reactions with cyanuric chloride are suitable as surface-active agent in the process according to the invention. Such agents are, for example, alkyl sulfates and alkyl ether sulfates such as sodium, ammonium, lithium and triethanolammonium salts (obtainable for example from Henkel, Düsseldorf under the trademark TEXAPON®, or nonylphenol polyglycol ether or mixtures of anionic and nonionic surfactants (obtainable for example from Atlas Chemie, Essen under the trademarks RENEX® and ATLOX®) or alkylsulfonates.

The agents sold under the trademarks TEXAPON K12®, RENEX 697®, and ATLOX 485323®, sodium dodecylsulfate, sodium octylsulfate, sodium 1-dodecanesulfonate and sodium 1-octanesulfonate (the latter obtainable for example from Fluka Feinchemikalien GmbH, Neu-Ulm) are particularly suitable.

Generally customary buffers are employed as buffer in the process according to the invention for the pH range from 6 to 10, preferably 7 to 9. Such buffers are, for example, phosphate buffer (e.g. $Na_2HPO_4$/$KH_2PO_4$), carbonate buffer, (e.g. Na carbonate/Na bicarbonate), acetate buffer (e.g. acetic acid/Na acetate), citrate buffer (e.g. citric acid/Na citrate) or tris-buffer (e.g. trishydroxymethylaminomethane/HCl).

0.1–4 Mol, preferably 0.2–2 mol, particularly preferably 0.3–1.2 mol, of nitrogen-containing heterocycle are preferably employed per mole of anhydroglucose of the cyclodextrin. The molar ratios employed are in this case selected depending on the desired degree of substitution and water content of the cyclodextrin used.

0.5–3 Mol of acid acceptor are preferably employed per mole of nitrogen-containing heterocycle.

For the preparation of monohalotriazinylcyclodextrin derivatives from 2,4,6-trihalo-1,3,5-triazines, 1.5–4 mol, preferably 1.75–3.5 mol, particularly preferably 1.8–3.2 mol, of acid acceptor are employed per mole of nitrogen-containing heterocycle.

For the preparation of monohalotriazinylcyclodextrin derivatives from dihalo-1,3,5-triazines, 0.5–2 mol, preferably 0.75–1.5 mol, particularly preferably 0.8–1.3 mol, of acid acceptor are employed per mole of nitrogen-containing heterocycle.

For the preparation of trihalopyrimidyl-cyclodextrin derivatives, 0.5–1.5 mol, preferably 0.75–1.25 mol, particularly preferably 0.8–1.2 mol, of acid acceptor are employed per mole of nitrogen-containing heterocycle.

For the preparation of dichloroquinoxalinyl or dichloropyrimidinylcyclodextrin derivatives, 0.5–2 mol, preferably 0.75–1.5 mol, particularly preferably 0.8–1.3 mol, of acid acceptor are employed per mole of nitrogen-containing heterocycle.

The cyclodextrin or cyclodextrin derivative and reaction medium are preferably employed in a quantitative ratio cyclodextrin/reaction medium of 1:30 to 1:1.5, preferably about 1:14 to 1:2, particularly preferably 1:12 to 1:3.

For the preparation of the cyclodextrin derivatives according to the invention, the cyclodextrin or cyclodextrin derivative, nitrogen-containing heterocycle, acid acceptor, reaction medium and, if appropriate, surface-active agent are mixed together either simultaneously or successively in the ratios given and well stirred.

It is important in the process according to the invention that the reaction medium is not too acidic.

In the reaction of cyclodextrin or cyclodextrin derivative with trihalotriazine for the preparation of monohalotriazinylcyclodextrins, the process according to the invention should be carried out at –10° C. to 35° C., preferably –5° C. to 25° C., particularly preferably –5° C. to 15° C.

The reaction of cyclodextrin or cyclodextrin derivative with trihalotriazine for the preparation of dihalotriazinylcyclodextrins should be carried out at –10° C. to 25° C., preferably –5° C. to 10° C., particularly preferably –5° C. to 5° C.

The reaction of cyclodextrin or cyclodextrin derivative with tetrahalopyrimidine should be carried out at 10° C. to 45° C., preferably 15° C. to 35° C., particularly preferably 20° C. to 35° C.

The reaction of cyclodextrin or cyclodextrin derivatives with heterocyclic acid chlorides is carried out at temperatures from 20° C. to 90° C., particularly at 30° C. to 80° C., in particular 40° C. to 70° C.

The process according to the invention is advantageously carried out at normal pressure.

The reaction times are, as a rule, between 0.5 and 6 hours, often between 2 and 4 hours.

By means of the process according to the invention, mixtures of cyclodextrin derivatives are preferably obtained having an average degree of substitution (DS) for $R^1$ of 0 to 2.0 depending on the cyclodextrin/cyclodextrin derivative employed as the starting material and a (DS) for $R^2$ of 0.1 to 3.0.

The average degree of substitution per anhydroglucose (DS value) for nitrogen-containing substituents can be determined by methods known from the literature by means of elemental analysis, such as described, for example, in U.S. Pat. No. 5,134,127 and U.S. Pat. No. 3,453,257 for sulfur- and nitrogen-containing substituents.

A determination of the reactive centers per anhydroglucose can be carried out by reaction of the derivatives according to the invention with nucleophiles, as is described as $DS_{Cl}$ in the examples with chlorine as the leaving group.

A further working up of the derivatives according to the invention can be carried out, if desired, using the methods generally known for cyclodextrin purification. Such methods are, for example: precipitation by means of alcohol/water mixtures, direct crystallization, adsorption chromatography or gen permeation chromatography and dialysis.

If the monochlorotriazinylcyclodextrin derivatives according to the invention were dissolved in water, a slow hydrolysis with elimination of HCl was observed. The resulting acid had an autocatalytic effect. It was possible to suppress the hydrolysis of the triazinylcyclodextrin derivatives according to the invention in buffer solutions having a pH of 7 to 9, preferably of about 8. In such aqueous solutions, the cyclodextrin derivatives according to the invention are stable on storage for more than at least 6 weeks.

The invention therefore likewise relates to solutions having a pH of 7 to 9, containing reactive cyclodextrin derivatives having at least one nitrogen-containing heterocycle which contains at least one electrophilic center.

The reactive cyclodextrin derivatives according to the invention are able to react with any desired compounds which carry one or more nucleophilic groups such as, for example, OH, NH or SH groups, with the formation of covalent bonds. The invention therefore also relates to compositions which contain the reactive cyclodextrin derivatives according to the invention in bonded form. Depending on the nature of the compound or depending on the number of nucleophilic groups in the compound, the preparation of novel cyclodextrin derivatives, cyclodextrin oligomers or cyclodextrin polymers is just as possible using the reactive cyclodextrin derivatives according to the invention as the bonding of cyclodextrins or cyclodextrin derivatives to polymers or a surface modification.

Ether-containing novel cyclodextrin derivatives can be prepared, for example, by reaction of the reactive cyclodextrin derivatives according to the invention with $C_1$ to $C_6$-alcohols, e.g. methanol, ethanol, 2-methoxy-ethanol or isopropanol, under slightly alkaline conditions at 40° C. to 100° C.

By reaction of the cyclodextrin derivatives according to the invention with thiols such as e.g. ethanethiol or propanethiol, thioether-containing cyclodextrin derivatives can be prepared.

By reaction of the cyclodextrin derivatives according to the invention with primary or secondary amines, for example alkylamines such as methyl- or dimethylamine, ethyl- or diethylamine, aniline or aniline derivatives, or hydroxyalkylamines such as morpholine or morpholine derivatives, basic cyclodextrin derivatives can be prepared.

By reaction with tertiary amines such as, for example, trimethylamine, triethylamine, pyridine or pyridine derivatives such as, for example, nicotinic acid or nicotinic acid derivatives, or diazabicyclooctane, positively charged cyclodextrin derivatives can be prepared which are in turn reactive cyclodextrin derivatives themselves.

The cyclodextrin oligomers or cyclodextrin polymers can be prepared, for example, as follows using the reactive cyclodextrin derivatives according to the invention:

By reaction of the reactive cyclodextrin derivatives according to the invention with compounds which carry two or more nucleophilic groups, crosslinking of the cyclodextrin derivatives or the formation of nucleophiles which carry the nucleophilic group on a spacer occurs. Examples of compounds which carry two or more nucleophilic groups which may be mentioned are dialcohols or oligoalcohols such as 1,3-diaminopropane, 1,4-diaminobutane, 1,3- propanediol, 1,4-butanediol, aminobutanol, di- or oligoamines, di- or oligothiols or mixed nucleophiles such as aminoalcohols, etc. or even cyclodextrins/derivatives or the reactive cyclodextrin derivatives themselves.

If the reactions are carried out at high dilution, uncrosslinked cyclodextrin derivatives are also obtained which contain a nucleophilic group, e.g. OH, NH or SH, on a spacer, which themselves are thus in turn nucleophiles.

By reaction of the reactive cyclodextrin derivatives according to the invention with soluble polymers or biopolymers such as, for example, $\alpha,\beta,\gamma$-cyclodextrin, $\alpha,\beta,\gamma$-cyclodextrin derivatives, starch or starch derivatives, polyvinyl alcohol (PVA) or PVA derivatives, polyallylamines, oligomeric sugars or sugar derivatives, modified polymers can be prepared which are able to solubilize substances which are poorly soluble in water.

The substances thus obtained can be employed, for example, as selective separating media in chromatography.

By reaction of the reactive cyclodextrin derivatives according to the invention with insoluble polymers or biopolymers which carry nucleophilic groups, such as, for example, cellulose or cellulose derivatives, polymeric sugars or sugar derivatives, chitin, gelatin, polyvinyl alcohols or their derivatives, or polyallylamines, modified polymers can be prepared which are able to solubilize substances which are poorly soluble in water.

The substances thus obtained can be employed, for example, as selective separating media in chromatography.

The present invention further relates to polymers to which 0.1 to 100% by weight of at least one reactive cyclodextrin derivative having at least one nitrogen-containing heterocycle is covalently bonded.

0.3 to 25% by weight of said cyclodextrin derivative are preferably bonded to the polymer.

Linkage preferably takes place in the outer regions of the polymer.

The polymers covalently equipped with CD have all kinds of advantageous properties.

The CDs can themselves exert effects on the properties of the polymer; for example, the CDs cause:

improvement in the adhesion to surfaces;

solubilization of the polymer/oligomer in the corresponding matrix;

hydrophilization or hydrophobization of the polymer;

improvement of the wettability, increase in compatibility with the surrounding medium;

increase in stability to coagulation, polymers provided with CD form more stable emulsions;

modification of rheology;

improvement in film formation;

on copolymerization of styrene/butyl acrylate with water-soluble auxiliary monomers, water-soluble oligomers are often formed. These oligomers are bonded through the polymer equipped with CDs. As a result of the viscosity, which is now lower, the solids content of the dispersion can be raised. As a result of the bonding of these oligomers, their plasticizing effect is furthermore eliminated and the minimum film formation temperature is thereby raised; and the polymers equipped with CD are distinctly less susceptible to water.

The CD cavity can be utilized in a variety of ways, in this manner various novel effects were in some cases observed:

Active compounds can be included in the CD and released in a controlled manner. The CD then acts as an adhesion promoter. Examples of active compounds are: biocides, insecticides, fungicides, herbicides, pheromones, fragrances, flavorings, pharmaceutical active compounds, active compounds for antistatic finishing or flame retardant finishing, stabilizers (UV), dyestuffs.

active compounds can be stabilized (to light, temperature, oxidation, hydrolysis, evaporation) by the inclusion, solubilized and thus made (bio)available or released in controlled form. The advantage here is that the active compounds are bonded directly to the polymer and rendered compatible. No foreign substance has to be admixed which can later bleed;

undesired substances can be absorbed;

substances can be selectively absorbed. The polymers finished with CD are thus also suitable as separating materials;

in polymers equipped with CD, bleeding of noncovalently bonded auxiliaries is prevented. The auxiliaries are incorporated in homogeneous form. For example, cross-linkers (e.g. $AlCl_3$, $Al(OH)_3$, $B(OH)_3$) are incorporated in more homogeneous form. The incorporation times can be shortened;

the active compounds formulated in this way are distinctly less toxic than the free compounds. For example, isothiazolones/chloroacetamide are less skin-irritant in the form of the CD complex;

the residual monomers contained in the polymer (vinyl acetate, in particular water-insoluble monomers which copolymerize poorly, such as, for example, vinyl laurate, vinyl versatate, butyl acrylate) are complexed. As a result of the complexation, their release is delayed, so that a dispersion, for example, can be processed without danger. For example, the MAC values are not reached; and substances causing odors, e.g. degradation products, by-products of polymers, e.g. amines, acetic acid, etc., are complexed.

Examples of polymers suitable according to the invention are polymers having at least one nucleophilic group.

Examples of synthetic polymers are polyesters, polyamides, polyamines, phenolics, aminoplastics, polyurethanes, polyacrylic acids, polyacrylamides, polyallyl alcohols, polyallylamines, polyvinyl acetate polymers, polyvinyl alcohols, polyepoxides, silicones, polypropylene, polyethylene.

These must carry at least one nucleophilic group. Examples of nucleophilic groups are: —OH, —NH or SH groups.

The polymers can be prepared by polycondensation, polyaddition or free radical polymerization with the aid of different polymerization techniques:

Examples of reaction in homogeneous phase are solution polymerization or polymerization in substance.

Examples of reaction in heterogeneous phase are precipitation polymerization, suspension polymerization, emulsion polymerization and boundary surface polycondensation.

Suitable polymers according to the invention are furthermore natural polymers having at least one nucleophilic group, such as, for example: polysaccharide, e.g. starches, glycogens, mannans, pectins, chitins and derivatives or proteins, e.g. albumins, collagen, elastin, globulins, fibrinogens, wool, silk, polyglutamate, gelatin or polyisoprene or polynucleotides or lignin or lignin-containing substances.

The invention furthermore relates to processes for the preparation of the polymers according to the invention.

The following processes for the preparation of polymers according to the invention containing CD can be differentiated:

A) The equipping of a ready-made polymer. The polymer should be present in the reaction medium if possible in soluble, well-swollen or well-wetted form.

If ready-made polymers are equipped, the following processes can preferably be differentiated.

A1) Liquor process. The equipping of the polymer takes place in the liquor:

The polymer is suspended, swollen or dissolved in the solvent and reacted with the reactive (electrophilic) CD in the presence of an acid acceptor.

A2) Immersion process: The impregnation of the polymer takes place in the liquor, and the attachment outside the liquor. This process only works with polymers which are insoluble in the reaction medium:

The polymer is immersed in the liquor (consisting of solvent, reactive CD and acid acceptor) at RT or at elevated temperature, well impregnated, then removed from the liquor and attached and dried at elevated temperature.

B) The equipping of polymers takes place during the polymerization. The polymerization can be carried out:
in the homogeneous phase (solution polymerization or polymerization in substance);
in the heterogeneous phase (precipitation polymerization, suspension polymerization, emulsion polymerization or boundary surface polycondensation).

The polymerization in this case is carried out in equilibrium of the reactive CD and of an acid acceptor.

The reactive cyclodextrin derivatives having a nitrogen-containing heterocycle employed for equipping the polymer are the cyclodextrin derivatives according to the invention.

Particularly preferred cyclodextrin derivatives employed for finishing the textile materials or the leather are the following: 2,4-dichloro-1,3,5-triazinylcyclodextrins, 2-chloro-4-hydroxy-1,3,5-triazinylcyclodextrins (sodium salts), 2-fluoro-4-hydroxy-1,3,5-triazinylcyclodextrins (sodium salts), 2,4,5-trichloropyrimidylcyclodextrins, 5-chloro-2,4-difluoropyrimidylcyclodextrins, 6-(2,3-dichloro)quinoxalinylcyclodextrins, 5-(2,4-dichloro-pyrimidinyl)cyclodextrins, 2-amino-4-chloro-1,3,5-triazinylcyclodextrins, 2-chloro-4-ethylamino-1,3,5-triazinylcyclodextrins, 2-chloro-4-diethylamino-1,3,5-triazinylcyclodextrin, and 2-chloro-4-methoxy-1,3,5-triazinylcyciodextrins.

In particular, 2-chloro-4-hydroxy-1,3,5-triazinyl-β-cyclodextrin sodium salt (MCT-β-CD) is preferably employed.

Preferably, cyclodextrin derivatives having a DS (average degree of substitution per anhydroglucose) of up to DS 3.0, preferably DS 0.1 to 2.0, particularly preferably DS 0.3 to 1.0, are employed for the reaction with the polymers.

Besides the reactive cyclodextrin derivatives and the already mentioned polymers, the following starting materials are employed in the process according to the invention.

Acid acceptors: one or more substances selected from the group consisting of the alkali metal or alkaline earth metal hydroxides, alkali metal or alkaline earth metal hydrogen carbonates, alkali metal hydrogen phosphates, amines, tert-amines, pyridine or mixtures of these substances.

The following are preferably suitable: NaOH, KOH, sodium carbonate, potassium carbonate, sodium hydrogen carbonate, potassium hydrogen carbonate, disodium hydrogen phosphate, dipotassium hydrogen phosphate, sodium acetate, potassium acetate, pyridine, triethylamine or collidine, NaOH and sodium carbonate are particularly preferably suitable.

Toluene, xylene, acetonitrile, acetone, THF, methanol, ethanol, propanol, butanol, dioxane, formamide, methylformamide, dimethylformamide, N-methylpyrrolidone, DMPU (1,3-dimethyl-3,4,5,6-tetrahydro-2(1H)-pyrimidone), acetamide, methylacetamide, dimethylacetamide, DMSO or mixtures of these substances are solvents.

Suitable solvents are particularly preferably water and alcohols or mixtures. Water is especially suitable. However, it is just as possible to work in substances.

Additives: urea, alginate salts, alkali metal chlorides, alkali metal sulfates, ammonium sulfate, preferably sodium chloride, sodium sulfate, ammonium sulfate.

Said components are preferably employed in the following quantitative ratios:

CD concentration in the liquor (percentage by weight) 0.5–70%, preferably 3–50%, particularly preferably 5–30%.

Salt concentration in the liquor (percentage by weight) 0–30%, preferably 0 to 20%, particularly preferably approximately 10%.

Additive concentration 0–30%, particularly preferably 0–20%.

Base concentration in the liquor (percentage by weight) 0.2–30%, particularly preferably 0.5–10%.

Increase in alkali in the liquor when using carbonates as base (NaOH%) 0.1–3%, preferably 0.3 to 1%.

Molar ratios

"active chlorine"/acid acceptor equals 2:1 to 1:10, preferably 1:1 to 1:3 active (electrophilic) chlorine is determined by reaction with diethylamine, as described in Example 10.

The reaction is carried out at a temperature of 0° C. to 170° C., preferably between 20° C. and 100° C., particularly preferably between 40° and 98° C. The temperature is to be selected depending on the reactivity of the reaction components.

The reaction is preferably carried out at from normal pressure to a slight excess pressure (e.g. autogenous pressure when using closed apparatuses).

As a rule, the reaction times are between 5 minutes and 6 hours, frequently between 0.5 and 4 hours.

The polymers according to the invention can be obtained:

a) in homogenous form, e.g. as a polymeric material or resin;

b) in heterogenous form, e.g. as a suspension or emulsion.

Aqueous polymeric dispersions according to the invention can be atomized by spray drying and employed in powder form.

The polymers according to the invention are suitable for all applications which are known for polymers. They are suitable, for example, as a polymeric material. The polymers according to the invention are additionally suitable for all applications which are known for cyclodextrins.

Aqueous polymer dispersions according to the invention are particularly suitable as coating compositions and adhesives, for example, for paper, textiles, glass fibers, wood and cardboard.

Particularly suitable aqueous polymer dispersions are those having a solid content of 30 to 75%, which are modified with cyclodextrins derivatives of the general formula (I), containing homo- or copolymers of ethylenically unsaturated monomers.

Such aqueous polymer dispersions are obtainable by emulsion polymerization of one or more ethylenically unsaturated monomers containing reactive groups and, if appropriate, an emulsifier, by means of free radical initiators in aqueous medium, in the pressence of cyclodextrin derivatives of the general formula L Typical applications of the aqueous polymer dispersions or dispersion powders in these areas are their Use:
- as binders in paper manufacture;
- as binders for the preparation of pressed articles containing active compounds, preferably produced by direct compression;
- as adhesives for wood, paper, textiles;
- as binders for coatings, plasters and paints, in particular painting colors;
- in the building industry, in particular as additives for hydraulic binders such as cement and gypsum; and
- in particular in concrete, building adhesives, mortars, fillers and leveling materials.

The polymers according to the invention, or a paper, textile, glass fiber, wood or cardboard coated with the polymer dispersions according to the invention have an increased hydrophobicity. When more highly finished, the materials have a higher stiffness.

Paper, textiles, glass fiber, wood and cardboard can be finished with active ingredients, e.g. with fragrances, UV stabilizers, biocides, bactericides, insecticides, fungicides, pheromones. In articles finished in this way, unpleasant odors (e.g. perspiration, acetic acid, butyric acid, amines, sulfur compounds or residual monomers of toxic substances) can be suppressed. This can be advantageous, for example, during processing/application of these materials.

The CD-modified polymers according to the invention can be used for all applications, such as are known for cyclodextrins.

The following examples may be mentioned:
- solubilization of water-insoluble or poorly water-soluble substances, e.g. of active compounds, such as biocides, pharmceuticals, stabilizers;
- increase in the bioavailability of active compounds;
- stabilization of substances against light, temperature, oxidation, hydrolysis or from volatile substances;
- masking of bad taste or unpleasant odor;
- controlled release of active compounds such as biocides, pharmaceuticals;
- selective extraction or complexation of compounds (separation); and
- the formulation of active ingredients, e.g. as a powdered formulation.

By bonding of the reactive cyclodextrin derivatives according to the invention to surfaces carrying nucleophilic groups, these surfaces can be modified. For example, the reactive cyclodextrin derivatives according to the invention can be reacted with paper, pigments, gelatin or leather. The products thus obtained can be employed, e.g. as adhesion promoters, for increasing hydrophilicity or for complexing poorly water-soluble substances.

After reaction with textiles such as cotton, wool, natural or synthetic fibers etc., desired compounds can in each case be complexed to the surface of the textiles treated in this way. The complexing of biocides, UV stabilizers or fragrances, for example, to the textiles is thus possible.

The present invention furthermore relates to textile material, in particular a fiber, a filament, a yarn, a web or a sheet-like structure, or leather which is finished with 0.1 to 25% by weight, based on the weight of the untreated material, of at least one reactive cyclodextrin derivative having at least one nitrogen-containing heterocycle.

The textile material or leather is preferably finished with 0.3 to 10% by weight of said cyclodextrin derivative.

Finishing preferably takes place in the outer areas of the fibers or of the material.

Finishing takes place via covalent bonding of the reactive cyclodextrin derivatives. This causes a great wet- fastness and fastness to washing.

The finishing of the textile materials or of the leather with reactive cyclodextrin derivatives having at least one nitrogen-containing heterocycle is carried out analogously to the methods customary in the textile/leather industry for reactive dyestuffs having the appropriate reactive groups.

Examples of textile materials suitable for finishing are:
Cellulose fibers, particularly cotton, regenerated cellulose (e.g. viscose or cuprammonium filament yarn), fiber blends with cellulose or wool, particularly sheep's wool and polymer fibers such as polyester, polyamide or polyacrylonitrile having at least one nucleophilic group such as OH, SH or NH or fiber blends with these polymer fibers.

The invention furthermore relates to processes for the preparation of the materials according to the invention. Preparation is preferably carried out by means of a process which comprises dissolving the reactive cyclodextrin derivatives, which are described in greater detail below, in a suitable reaction medium (liquor), with addition of bases and, if appropriate, of salts and additives to the reaction medium, applying in a neutral to basic medium to the materials or leather, optionally drying the materials or the leather and then fixing at temperatures of 20°–220° C.

The liquor can be applied to the materials or leather in the batch process (exhaust process) in which fixing is carried out by heating the liquor, or in the semicontinuous residence process or in the continuous process, in which fixing is carried out outside the liquor on the liquor-soaked (impregnated), optionally dried material analogously to the dyeing techniques developed for the dyeing of textile materials or leather. Fixing in the last two processes is particularly efficient if the textile material has been largely freed from the liquor by squeezing off or even dried before fixing it. The materials are then thoroughly rinsed with cold and/or hot water and optionally washed with an effective detergent at appropriate temperature in an otherwise known manner.

The reactive cyclodextrin derivatives having a nitrogen-containing heterocycle employed for finishing the textile material or the leather are the cyclodextrin derivatives according to the invention.

The following cyclodextrin derivatives are particularly preferably employed for finishing the textile materials or the leather:

2,4-dichloro-1,3,5-triazinylcyclodextrins, 2-chloro-4-hydroxy-1,3,5-triazinylcyclodextrins (sodium salts), 2-fluoro-4-hydroxy-1,3,5-triazinylcyclodextrins (sodium salts), 2,4,5-trichloropyrimidylcyclodextrins, 5-chloro-2,4-difluoropyrimidylcyclodextrins, 6-(2,3-dichloro)quinoxalinylcyclodextrins, 5-(2,4-dichloro) pyrimidinylcyclodextrins, 2-amino-4-chloro-1,3,5-triazinylcyclodextrins, 2-chloro-4-ethylamino-1,3,5-triazinylcyclodextrins, 2-chloro-4-diethylamino-1,3,5-triazinylcyclodextrins and 2-chloro-4-methoxy-1,3,5-triazinylcyclodextrins.

2-Chloro-4-hydroxy-1,3,5-triazinyl-β-cyclodextrin (MCT-β-CD) is particularly preferably employed.

Cyclodextrin derivatives having a DS (average degree of substitution per anhydroglucose) of up to DS 3.0, preferably DS 0.2 to 2.0, particularly preferably DS 0.3 to 1.0, are preferably employed for reaction with the textile material or leather.

The reactive cyclodextrin derivatives are applied to the fiber or leather analogously to the reactive dyes. The dyeing machines customary in dyeing with reactive dyes are preferably utilized for this. Depending on reactivity, a differentiation is made between cold fixers and hot fixers. These differ in the reactivity of the reactive group.

The cold fixers include cyclodextrin derivatives having dichlorotriazine, monofluorotriazine, dichloroquinoxaline, difluorochloropyrimidine and vinylsulfone groups and the hot fixers include the monochlorotriazines and the trichloropyrimidines.

The cyclodextrin derivative particularly preferred according to the invention, 2-chloro-4-hydroxy-1,3,5-triazinyl-β-cyclodextrin, sodium salt (MCT-β-CD), is therefore included in the hot fixer group and is thus somewhat slower to react.

For finishing leather, the di- and monochlorotriazine or pyrimidinecyclodextrin derivatives or cyclodextrin derivatives containing vinylsulfonic acid groups are particularly suitable.

A suitable dyeing technique is described, for example, in Ullmann's Encyclopedia of Industrial Chemistry 5th Edition, Vol. A 22, page 662.

For the finishing of textile materials or leather with the reactive cyclodextrin derivatives, 3 fixing process are differentiated:

1. Exhaust process or batch process

This process is used to treat loose materials such as yarn or piece goods (e.g. textile fabric: yarn, knitted and woven goods, pile fabrics, terry goods, fiber blends). The cyclodextrin derivatives are applied in the liquor by heating. Bases and, if appropriate, salts and additives are either completely added to the liquor at the start of the process or added during the process in portions after a certain time and at a certain temperature.

Reaction parameters for the cold fixers

20°–60° C., preferably 30°–50° C.;

pH=9–12, preferably pH=10–11;

total reaction time 0.1–4 hours, preferably 0.2–2 hours;

Reaction parameters for the hot fixers, e.q. MCT-β-CD

20°–100° C., preferably 50°–98° C.;

pH=10–13, preferably pH=11–12;

total reaction time at a fixing temperature of 90°–98° C., 0.1–4 hours, preferably 0.2–1.5 hours;

total reaction time at a fixing temperature of around 25° C., 5–40 hours, preferably 7–25 hours.

2. Semicontinuous residence process

This process is used to treat piece goods (e.g. cellulose piece goods). The material is impregnated with the liquor, and fixing takes place outside the liquor at room temperature or by heating, after the textile material has been dried by squeezing off to a defined liquor content. Reaction parameters for the cold fixers; pH=9–12, preferably pH=10–11; residence period at 18°–60° C., preferably 20°–40° C. outside the liquor 1–10 hours, preferably 2–8 hours.

Reaction parameters for the hot fixers, e.g. MCT-β-CD

20°–100° C., preferably 50°–98° C.;

pH=10–13, preferably pH=11–12;

total reaction time at a fixing temperature of 90°–98° C., 0.1–4 hours, preferably 0.2–1.5 hours;

total reaction time at a fixing temperature of around 25° C., 5–40 hours, preferably 7–25 hours.

3. Continuous process

In this process, piece goods (e.g. cellulose piece goods) are finished and washed in one operation. The material is impregnated with the liquor (cyclodextrin derivative, base and optionally salt and additives) and then dried. Fixing is carried out by subsequent treatment at higher temperature by means of treatment of hot air or saturated stream or by contact heating. Rinsing and washing the material complete the finishing process. Hot fixers such as MCT-β-CD are preferred.

Reaction parameters for the cold fixers; pH=9–12, preferably pH=10–11; residence period at 18°–60° C., preferably 20°–40° C., 1–10 hours, preferably 2–8 hours; fixing at 90°–160° C., preferably 100°–140° C.; fixing period 5–180 s, preferably 10–100 s.

Reaction parameters for the hot fixers, e.g. MCT-β-CD pH=10–13, preferably pH=11–12;

fixing at 20°–100° C., preferably 50°–98° C., for 0.1–4 hours, preferably 0.2–1.5 hours. The fixing period at a temperature of around 25° C. is 5–40 hours, preferably 7–25 hours.

fixing at 100°–230° C., preferably 140°–220° C.;

fixing period 10–900 s, preferably 16–600 s.

In the process according to the invention, the solvents employed are preferably water or softened water.

The salts employed are alkali metal chlorides, alkali metal sulfates or ammonium sulfate, preferably sodium chloride, sodium sulfate or ammonium sulfate.

Additives are e.g. urea or alginate.

The bases employed are alkali metal hydroxide, alkali metal carbonates, alkali metal hydrogen carbonates, alkali metal hydrogen phosphates and their mixtures, preferably: NaOH, KOH, sodium carbonate, potassium carbonate, sodium hydrogen carbonate, potassium hydrogen carbonate, disodium hydrogen phosphate, dipotassium hydrogen phosphate, trisodium phosphate, tripotassium phosphate, mixtures of NaOH and sodium carbonate or of KOH and potassium carbonate, particularly preferably: sodium carbonate or mixtures of NaOH and sodium carbonate.

The said components are preferably employed in the following quantitative ratios:

CD concentration in the liquor (percentage by weight) 0.5–70%, preferably 3–50%, particularly preferably 5–30%.

The salt concentration in the liquor (percentage by weight) 0–30%, preferably 0–20%, particularly preferably 0–10%.

Additive concentration in the liquor (percentage by weight) 0–30%, particularly preferably 0–20%.

Base concentration in the liquor (percentage by weight) 0.2–20%, particularly preferably 0.5–10%.

Increase in alkali in the liquor when using carbonates as base (percentage by weight of sodium hydroxide solution) 0.1–3%, particularly preferably 0.3–1%.

Cyclodextrin is covalently bonded to the textile materials or leather by the process described, preferably in the outer regions. The cavities of the cyclodextrins are thus available and consequently all CD-typical applications are possible.

The cavity of the cyclodextrin can be utilized in a variety of ways. As an example, some applications for the finishing of textile materials or leather may be mentioned:

active ingredients can be included in the cyclodextrin and released again in a controlled manner.

The cyclodextrin acts here as a bonding agent. Examples of such active ingredients are: biocides, bactericides, insecticides, fungicides, antimicrobial compounds (e.g. for use in hospital hygiene, shoe finishing etc.), herbicides, pheromones, fragrances (e.g. for fragrant finishing of textiles), flavorings, pharmaceutical active bandages, fabrics for medical applications etc.), active ingredients for antistatic finishing or flame-retardant finishing, stabilizers (e.g. against UV radiation), filters (e.g. against UV radiation), dyes.

active ingredients can be stabilized (against light, temperature, oxidation, hydrolysis, evaporation) by inclusion and released in a controlled manner.

As a result of the possibility of the cyclodextrin complexing poorly water-soluble substances, completely novel properties of the materials also result.

The intercalation of perspiration or perspiration degradation products in the textile material by complexation of these substances is thus prevented. Simple cleaning of the corresponding materials is also associated therewith (replacement of the perspiration products by the surfactants in the washing solution). After washing, perspiration odor no longer remains on the material.

By complexing perspiration or perspiration breakdown products, the odor when wearing these textile materials is distinctly decreased.

In the case of mixed fibers, the hydrophilicity and wettability of the fibers and thus the wearer comfort can be increased by finishing with cyclodextrin derivatives.

The reactive cyclodextrin derivatives described can be used as a starch replacement, e.g. for permanent crease resistance.

The cyclodextrin derivative bonded to textile material or leather can also be employed as a bonding agent, e.g. for polymeric substances having lipophilic radicals. Textile materials or leather can thus also be conveniently finished using completely novel substances.

By bonding of the reactive cyclodextrin derivatives according to the invention to surfaces carrying nucleophilic groups, these surfaces can be modified. For example, the reactive cyclodextrin derivatives according to the invention can be reacted with paper, pigments, gelatin or leather. The products thus obtained can be employed e.g. as adhesion promoters, for increasing hydrophilicity or for complexing poorly water-soluble substances.

After reaction with textiles such as cotton, wool, natural or synthetic fibers, etc., desired compounds can be complexed to the surfaces of the textiles treated in this way. The complexing of biocides, UV stabilizers or fragrances, for example, to the textiles is thus possible.

By reaction with cellulose, cellulose derivatives, polymeric sugars or their derivatives, gelatin, polyvinyl alcohols or PVA derivatives or polyallylamines, membranes, foils, films, etc., can be prepared. These are particularly suitable for extraction purposes, e.g. ultrafiltration, reverse osmosis dialysis, etc.

By reaction with the reactive cyclodextrin derivatives according to the invention, known chromatography materials can be modified in their properties. For example, the selectivity of these materials can be greatly increased. Chromatography materials suitable for modification are, for example, silica gel, agarose, cellulose, dextran, silica, kieselguhr-crosslinked cellulose, agarose or kieselguhr-agarose matrices.

The reactive cyclodextrin derivatives according to the invention are furthermore suitable for all applications known for cyclodextrins and cyclodextrin derivatives. An example which may be mentioned is the solubilization of substances which are not soluble or are poorly soluble in water in the pharmaceutical field, for example for increasing the bioavailability of a medicament, in foodstuff technology, e.g. for stabilizing antioxidants, in the cosmetic field, e.g. for stabilizing volatile substances, or in the agricultural field, e.g. for formulating active substances, and also the known applications in process technology (e.g. separations).

Cyclodextrin-containing polymers according to the invention are particularly suitable for applications in chromatography or for separations.

The following examples serve for the further illustration of the invention.

For characterization of the cyclodextrin derivatives the following methods were used:

Thin-layer chromatogram (TLC):
Mobile phase: acetonitrile/n-butanol/conc. ammonia/water=5:2:1:4.
TLC plates: silica gel, Merck item No. 802815. $^1$H- or $^{13}$C-NMR The $DS_{Cl}$ value for the nitrogen-containing heterocyclic radicals was carried out with the cyclodextrin derivatives of the examples as follows:

4.5 ml of diethylamine and 4.5 ml of water were added to 1 g of the cyclodextrin derivative according to the invention to be investigated (correspondingly more in samples with a high salt content) in 4.5 ml of water. The solution was stirred at room temperature for 20 h and then concentrated in vacuo on a rotary evaporator, treated once more with water and again evaporated to dryness. The residue was then taken up in 20 ml of distilled water, dialyzed against distilled water for 2 d (benzoylated cellulose: Sigma item No.: D 7884) and again evaporated to dryness. Precipitate which may be present is filtered off. It contains no cyclodextrin.

The average degree of substitution ($DS_{Cl}$) per anhydroglucose by active chlorine can then be determined by $^1$H-NMR (d6-DMSO/trifluoroacetic acid). It results from the following formula:

$$DS_{Cl} = (\tfrac{1}{6} \times I1)/((I2 - \tfrac{2}{3} \times I1)/7)$$

in this formula:

I1=integral of the methyl protons of the diethylamine from 0.5 to 1.75 ppm, I2=total integral of all protons of the anhydroglucose of the cyclodextrin derivative and of the methylene protons of the diethylamine from 2.75 to 6 ppm.

The determination of the DS values for the other radicals which may still be present in the derivatives according to the invention was carried out as known from the prior art.

The following methods were further used for the characterization of the cyclodextrin polymers:

IR spectroscopy
Measurement of the bleaching of an alkaline phenolphthalein solution (1N NaOH)
Measurement: Reflectance TLC scan at 572 nm.

Dispersions were prepared in a double-walled 2 l reaction vessel having an anchor stirrer. The monomers and auxiliaries were added by means of precision metering vessels. The catalysts, e.g. (APS/Brüggolit) were metered in as 4% strength or 2% strength solutions using a peristaltic pump. The temperature was kept constant, e.g. at 45° C., with the aid of a thermostat and of an internal temperature regulator.

The dispersions prepared in this way were characterized with respect to solids content, residual monomer content, viscosity, K value and particle size. Wet residue and dispersion stability were assessed.

To assess the film properties of the dispersions prepared in the examples, the dispersions were poured into a mold and then dried. A film resulted having a film thickness of about 1 mm. The strength, tackiness, the exudation, appearance and the hardness of the film were visually assessed.

Other objects and features of the present invention will become apparent from the following Examples, which disclose the embodiments of the present invention. It should be understood, however, that the Examples are designed for the purpose of illustration only and not as a definition of the limits of the invention.

The following examples serve to illustrate the invention in greater detail.

EXAMPLE 1

Preparation of 2-chloro-4-hydroxytriazinyl-β-cyclodextrin (sodium salt) $DS_{Cl}$ 0.3 by reaction of β-cyclodextrin with cyanuric chloride 10 g of water and 10 g of ice were initially introduced into a round-bottomed flask with 1.2 g of NaOH. 5.5 g of cyanuric chloride were added in three equal portions with vigorous stirring at a temperature of 0° to 5° C. in the course of 30 min. A solution of 10 g of β-cyclodextrin (10% water content) in 10 ml of water and 1.2 g of NaOH was then added dropwise slowly and with vigorous stirring to the suspension at pH 7 and a temperature of 0°–15° C. After stirring for 1.5 h, pH 7 was attained. The still-cold suspension was filtered off with suction by means of a frit and the precipitate was discarded. After freeze-drying the filtrate, 13.8 g of the chlorotriazinyl-β-cyclodextrin having an ash content of 25.5% was obtained. The average degree of substitution by active chlorine was $DS_{Cl}=0.3$. The water solubility was above 50% (g/g). β-Cyclodextrin was no longer detectable in the thin-layer chromatogram.

EXAMPLE 2

Preparation of 2-chloro-4-hydroxy-β-cyclodextrin (sodium salt) $DS_{Cl}=0.4$ 300 g of water, 0.6 g of TEXAPON® K 12 and 150 g of ice were initially introduced into a 2 l round-bottomed flask. 118.8 g of cyanuric chloride were then added in one portion at 0° C. and the flask was evacuated three times with stirring and pressurized again. 25.95 g of sodium hydroxide solution, dissolved in 270 g of water, were then added dropwise in the course of 1 hour. The temperature thereupon rose to 3° C. The pH of the solution at this position was greater than pH 12. The mixture was further stirred until the pH had fallen to pH 7–8. 5.19 g of sodium hydroxide solution dissolved in 150 g of water were then added in the course of 10 min. The pH was then pH 11. The addition of 108 g of β-cyclodextrin (10% water content), dissolved in 270 g water containing 25.95 g of sodium hydroxide solution, was then begun immediately at 0°–5° C. The addition lasted 1 h. The pH was then >12. Stirring was continued until the pH had fallen to pH 11 and the mixture adjusted to pH 8–8.5 using approximately 20 ml of 0.8% phosphoric acid and filtered off with suction at 0°–5° C. through a frit. The precipitate was discarded and the filtrate was freeze-dried. The desired cyclodextrin derivative having $DS_{Cl}=0.4$ and an ash content of 32% was thus obtained.

EXAMPLE 3

Preparation of 2-chloro-4-hydroxytriazinyl-β-cyclodextrin (sodium salt) $DS_{Cl}$ 0.9

39.6 g of cyanuric chloride were initially introduced into 150 g of water at 2° C. with vigorous stirring. 8.65 g of NaOH in 28 g of water were then added dropwise at an internal temperature of 2°–3° C. in the course of 15 min. After the end of addition, the pH of the suspension was pH 10–11. 36 g of β-cyclodextrin (10% water content)—dissolved in 54 g of water containing 8.65 g of NaOH—were then added at 5°–7° C. in the course of 40 min. After addition, the mixture was stirred at 7° C. for a further 25 min., the pH slowly falling to pH 9–10. After filtration through a glass frit, the powdery precipitate was discarded and the filtrate, which had a pH of 7, was freeze-dried. 67 g of the triazinyl-β-cyclodextrin derivative having an ash content of 32% (g/g) and a $DS_{Cl}$ value of 0.9 were thus obtained.

EXAMPLE 4

Preparation of 2-chloro-4-hydroxytriazinyl-β-cyclodextrin (sodium salt) $DS_{Cl}$ 1.5 by reaction of β-cyclodextrin with cyanuric chloride 20 g of water and 20 g of ice were initially introduced with 3.6 g of NaOH. 16.5 g of cyanuric chloride were then added in four portions at a temperature of 0°–5° C. in the course of 45 min. 10 g of B-cyclodextrin (90%)—dissolved in 30 ml of water containing 3.6 g of NaOH—were then slowly added dropwise to the suspension at a temperature of 0°–15° C. and pH 7. After 2 h a pH of 7 was attained. The still-cold suspension was filtered off with suction and the precipitate was discarded. After freeze-drying of the filtrate, 17.54 g of the chlorotriazinyl-β-cyclodextrin were obtained having a salt content of 44%. The average degree of substitution by active chlorine was $DS_{Cl}$ of 1.5. The water-solubility was above 25% (g/g). β-Cyclodextrin was no longer detectable in the thin-layer chromatogram.

EXAMPLE 5

Preparation of 2-chloro-4-hydroxytriazinyl-β-cyclodextrin, (Na salt) $DS_{Cl}$ 0.5 by reaction of β-cyclodextrin with cyanuric chloride 10 kg of water were cooled to 1° C. in a 63 l vessel having an enamel coating and treated with 8.6 kg of ice. After addition of 10 g of sodium dodecylsulfate as an emulsifier, 2 kg of cyanuric chloride were added to the well-stirred solution. A solution of 0,868 kg of sodium hydroxide in 4 kg of water was then added dropwise at a temperature of 0°–5° C. in the course of 5 h. The pH during this time should be below pH 12. After the addition of alkali, the reaction solution was stirred at 5° C. for a further 0.5 h. A clear solution of the sodium salt of 2,4-dichloro-6-hydroxy-1,3, 5-triazine in water was thus obtained. A mixture of 3.08 kg of β-cyclodextrin, 0.434 kg of sodium hydroxide and 4 kg of water were then added dropwise at 5°–15° C. in the course of 2 h to this well-stirred solution. During this addition, the pH should be between pH 10 and pH 13. Stirring was continued for a further 1–2 h until a pH change no longer occurred. The pH was then pH 9.6. During the course of this the solution came to room temperature. It was then filtered through a 0.45/0.2 μm filter. After spray-drying of the solution (inlet temperature of 235° C., outlet temperature of 120° C.), 5.4 kg of the triazinyl-β-cyclodextrin derivative having an ash content of 22% were thus obtained. The average degree of substitution by active chlorine was $DS_{Cl}$ of 0.52. The water-solubility was above 55% (g/g). β-Cyclodextrin was no longer detectable in the thin-layer chromatogram.

EXAMPLE 6

Preparation of 2-chloro-4-hydroxytriazinyl-β-cyclodextrin, (Na salt) $DS_{Cl}$ 0.5 by reaction of β-cyclodextrin with the sodium salt of 2,4-dichloro-6-hydroxy-1,3,5-triazine 25 kg of the sodium salt of 2,4-dichloro-6-hydroxy-1,3, 5-triazine were added as an 8% solution in water to a 63 l vessel having an enamel coating and the mixture was cooled to 10° C. with stirring. A (cooled) solution of 3 kg of β-cyclodextrin and 0.426 kg of sodium hydroxide in 4 kg of water was then added dropwise at 10°–15° C. in the course of 2 h to the well-stirred solution. The pH during the dropwise addition was pH 10–13. After addition of the β-CD solution, stirring of the reaction mixture was continued without cooling for a further 2 h until a pH change no longer occurred. The solution came to room temperature during the course of this. The solution was then filtered through a 0.45/0.2 μm filter. After spray-drying of the solution (inlet temperature of 235° C., outlet temperature of 120° C.), 5.5 kg of the triazinyl-β-cyclodextrin derivative having an ash content of 22% were thus obtained. The average degree of substitution by active chlorine was $DS_{Cl}$ of 0.5. The water-solubility was above 55% (g/g). β-Cyclodextrin was no longer detectable in the thin-layer chromatogram.

EXAMPLE 7

2-Chloro-4-hydroxytriazinyl-γ-cyclodextrin (sodium salt) $DS_{Cl}$ 0.9 by reaction of γ-cyclodextrin with cyanuric chloride 20 g of water and 10 g of ice were initially introduced with 2.4 g of NaOH. 11 g of cyanuric chloride were then added in three portions in the course of 30 min at a temperature of 0°–5° C. and the mixture was stirred at 5° C. until a pH of 7 was achieved. 1.2 g of NaOH were added to the suspension. 10 g of γ-cyclodextrin (dissolved in 20 ml of water containing 1.2 g of NaOH) were then added slowly to the suspension at a temperature of 0°–15° C. After 1.5 h, a pH of 7 was attained. The still-cold suspension was filtered off with suction and the precipitate was discarded. After freeze-drying of the filtrate, 20.9 g of the chlorotriazinyl-γ-cyclodextrin were obtained having an ash content of 33% (g/g). The average degree of substitution by active chlorine was equal to 0.9 and the water-solubility was 25% (g/g). γ-Cyclodextrin was no longer detectable in the thin-layer chromatogram.

EXAMPLE 8

Chlorotriazinyl-β-hydroxypropylcyclodextrin MS (hydroxypropyl) 0.77, $DS_{Cl}$ 0.7 by reaction of hydroxypropyl-β-cyclodextrin with cyanuric chloride 20 g of water and 10 g of ice were initially introduced with 2.4 g of NaOH. 11 g of cyanuric chloride were then added in four portions at a temperature of 0°–5° C. in the course of 30 min. 10 g of HP-β-cyclodextrin MS 0.77—dissolved in 20 ml of water containing 2.4 g of NaOH—were then slowly added dropwise to the suspension at a temperature of 0°–15° C. and pH of 7. After 1.5 h a pH of 7 was attained. The still-cold suspension was filtered off with suction and the precipitate was discarded. After filtration and freeze-drying of the filtrate, 21.4 g of the chlorotriazinyl-β-hydroxypropylcyclodextrin derivative were obtained. The solubility in water was 25% (g/g) and the ash content 33% (g/g). The average content of active chlorine per anhydroglucose unit was $DS_{Cl}$ of 0.7.

EXAMPLE 9

Preparation of dichlorotriazinyl by rodextrin $DS_{Cl}$ 1.0 by reaction of β-cyclodextrin with cyanuric chloride 9.1 g of β-cyclodextrin and 2 g of NaOH were initially introduced in 26 g of water. 7.36 g of cyanuric chloride were added in three portions at 2° C. in the course of 30 min. and the mixture was stirred. After 2 h the pH was pH 7.2. The pH was stabilized by addition of 4 g of $Na_2HPO_4$ and 6 g of $KH_2PO_4$ in 50 g of water. The solution was filtered cold and then freeze-dried. 19.6 g of the dichlorotriazinylcyclodextrin derivative having an ash content of 39% were obtained. The $DS_{Cl}$ by active chlorine was 1.0.

EXAMPLE 10

Reaction of 3-N-ethylamino-2-hydroxypropyl-β-cyclodextrin (MS 0.17) with cyanuric chloride (linkage of the cyclodextrin to the heterocycle via a spacer)

3-N-Ethylamino-2-hydroxypropyl-β-cyclodextrin (MS 0.17) was prepared according to the method of A. Deratani and B. Popping (Makromol. Chem., Rap. Commun. 13, 237–41 (1992)) by reaction of 3-chloro-2-hydroxypropyl-β-cyclodextrin with ethylamine.

1.1 g of cyanuric chloride were initially introduced in 5 g of water, 5 g of ice and 0.24 g of NaOH at a temperature of 0°–5° C. The suspension was stirred until a pH of 7 was achieved. 1 g of the basic β-cyclodextrin derivative (3-N-ethylamino-2-hydroxypropyl-β-cyclodextrin (MS 0.17)) was then added dropwise dissolved in 5 g of water. The mixture was stirred at a temperature of less than 5° C. for 5 hours. It was adjusted to pH 6.9 by addition of 4 ml of 10% $NaHCO_3$ solution (g/g) and the suspension was filtered. Freeze-drying yielded 1.6 g of the desired cyclodextrin derivative having a salt content of 42% (g/g). The average content of active chlorine per anhydroglucose was $DS_{Cl}$ of 0.1.

EXAMPLE 11

Reaction of hydroxypropyl-β-cyclodextrin (MS 0.9) with 2,4,5,6-tetrachloropyrimidine 12 g of hydroxypropyl-β-cyclodextrin (MS 0.9) were dissolved in 30 g of water. 8.72 g of 2,4,5,6-tetrachloropyrimidine, dissolved in 30 ml of acetone, were then added dropwise with vigorous stirring at 30°–35° C. and a pH of 6–6.5 in the course of 1 h. The pH was kept constant using an aqueous sodium hydroxide solution. After addition of the pyrimidine, stirring was continued for 1 h, the acetone was evaporated, the mixture was filtered and the filtrate was freeze-dried. 5 g of the reactive component according to the invention having a salt content of 31% and an active chlorine content of $DS_{Cl}$ of 0.5 were obtained.

EXAMPLE 12

Preparation of basic cyclodextrin derivatives by reaction of monochlorotriazinyl-β-cyclodextrin $DS_{Cl}$ 0.4 (Example 2) with diethylamine 1.6 g of the monochlorotriazinyl-β-cyclodextrin $DS_{Cl}$=0.4 (Example 2) were dissolved in 10 ml of water and treated with 5 ml of diethylamine, and the mixture was stirred at room temperature for 20 h and then concentrated in vacuo on a rotary evaporator, treated once more with water and again concentrated to dryness. The residue was taken up in distilled water and analyzed against distilled water for 2 d. The precipitate formed was filtered off (according to $^{13}$C-NMR it contains no cyclodextrin). The solution was then evaporated to dryness. 1.6 g of the basic cyclodextrin derivative were thus obtained.

EXAMPLE 13

Preparation of basic cyclodextrin derivatives by reaction of monochlorotriazinyl-β-cyclodextrin $DS_{Cl}$ 0.4 with ethylamine The reaction of monochlorotriazinyl-β-cyclodextrin $DS_{Cl}$ 0.4 (Example 2) with ethylamine was carried out as described in Example 12. 0.8 g of the amine derivative was obtained from 1 g of monochlorotriazinyl-β-cyclodextrin $DS_{Cl}$ 0.4.

EXAMPLE 14

Preparation of dihydroxytriazinyl-β-cyclodextrin 15 g of monochlorotriazinyl-β-cyclodextrin $DS_{Cl}$ 0.4 (Example 2) were heated to 70° C. in 11 of water. During the course of this the pH fell to pH 3.9. The solution was treated with 3.3 g of NaOH—dissolved in 22 ml of water—in the course of 1 h and kept at 70° C. for a further 2 hours. The mixture was then adjusted to pH 7 using 2N HCl. Concentration of the solution to 80 ml was then carried out on a rotary evaporator.

This solution was then added dropwise to 720 ml of methanol over a period of 60 min. The precipitate was washed with 90% methanol. 7.5 g of dihydroxytriazinyl-β-cyclodextrin having a sodium chloride content of 5.8% were obtained.

EXAMPLE 15

Reaction of monochlorotriazinyl-β-cyclodextrin $DS_{Cl}$ 0.4 with triethylamine for the preparation of charged cyclodextrin derivatives 15 g of monochlorotriazinyl-β-cyclodextrin $DS_{Cl}$ 0.4 prepared according to Example 2 were dissolved in 60 ml of water and treated with 30 ml of triethylamine. The clear solution was stirred at 60° C. for 24 h. For working up, the mixture was concentrated in vacuo on a rotary evaporator, the residue was taken up in distilled water and the solution was dialyzed against distilled water for 2 d. After freeze-drying, 19 g of the charged cyclodextrin derivative were thus obtained. The average degree of substitution of triethylamine per anhydroglucose was 0.3. This derivative can likewise be employed as a reactive component with triethylamine as leaving group.

EXAMPLE 16

Preparation of water-insoluble cyclodextrin oligomer by reaction of monochlorotriazinyl-β-cyclodextrin with itself 7.5 g of monochlorotriazinyl-β-cyclodextrin prepared according to Example 2 were treated with 2.5 g of sodium carbonate, thoroughly mixed in a mortar and stirred overnight at 80° C. An insoluble cyclodextrin polymer was formed, which was pulverized in the mortar, thoroughly stirred in 1 l of water and filtered off with suction through a frit. 4.5 g of the insoluble cyclodextrin polymer were thus obtained.

EXAMPLE 17

Preparation of a polyallyamine modified with cyclodextrin by reaction of monochlorotriazinyl-β-cyclodextrin with polyallylamine 5 g of polyallylamine (PAA, commercially available, for example, from Aldrich, Steinheim, under the order no. 28.321-5) were dissolved in 25 g of water. The pH of the solution was adjusted to pH 7 using NaOH. The solution was treated with 0.1 g of $Na_2CO_3$ and heated to 40° C. 1.7 g of monochlorotriazinyl-β-cyclodextrin $DS_{Cl}$ 0.4 (40% ash) prepared analogously to Example 2 were then added. The solution obtained was heated to 98° C. in the course of 45 min. and treated with a further 0.3 g of $Na_2CO_3$ and kept at this temperature for one hour. The pH was then 6.6. A blank sample containing β-cyclodextrin instead of the triazinyl derivative was used as a comparison. The pH at the end of the reaction here was 9.7. For working up, the mixture was adjusted to pH 7 using NaOH and dialyzed against distilled water for 5 d (dialysis tubing obtainable, for example, from Sigma, Deisenhofen, under the order number Sigma D 9652) and then freeze-dried. The incorporation of the triazinyl derivative was confirmed with the aid of the IR spectrum (KBr pressing). An insoluble polymer resulted from the soluble PAA.

EXAMPLE 18

Preparation of a polyvinyl alcohol modified with cyclodextrin by reaction of monochlorotriazinyl-β-cyclodextrin with polyvinyl alcohol The reaction was carried out as described in Example 17, but using polyvinyl alcohol (obtainable, for example, from Wacker-Chemie, Munich, under the designation Wacker V03/180) as the soluble polymer. The pH at the end of the reaction was 7.7. A soluble polymer was obtained. The incorporation of the triazinyl derivative was confirmed by $^{13}$C-NMR.

EXAMPLE 19

Preparation of a starch modified with cyclodextrin by reaction of monochlorotriazinyl-β-cyclodextrin with starch 5 g of starch (obtainable, for example, from Merck under the item number Merck 1252.0250) were dissolved in water at 98° C. and the solution was cooled. 0.1 g of $Na_2CO_3$ and 1.7 g of monochlorotriazinyl-β-cyclodextrin $DS_{Cl}$ 0.4 (40% ash) prepared analogously to Example 2 were added at 40° C. The mixture was heated to 98° C. in the course of 45 min. The solution was then treated with 0.3 g of $Na_2CO_3$ and kept at 98° C. for 1 h.

A solid of rubbery consistency was formed. After addition of 25 ml of water and cooling to room temperature, rubbery crumbs were obtained, which were separated off and dialyzed against distilled water for 5 d (Sigma D 9652). It was possible to confirm the incorporation of the triazine derivative by an IR spectrum. The product obtained was a water-insoluble polymer.

EXAMPLE 20

Preparation of a cellulose modified with cyclodextrin 1.7 g of monochlorotriazinyl-β-cyclodextrin $DS_{Cl}$ 0.4 (40% ash) prepared analogously to Example 2 were added to 25 g of water, and the solution was treated with 0.1 g of $Na_2CO_3$ and briefly stirred at 40° C. 5 g of cellulose (obtainable, for example, from Fluka under the order number 22183) were then added. The solution was heated to 98° C. in the course of 45 min, 0.5 g of sodium chloride being added in each case after 15 min. and 30 min. 0.3 g of $Na_2CO_3$ was added at 98° C. The solution was kept at 98° C. for 1 h. It was then cooled to room temperature, and the modified cellulose was filtered off with suction and thoroughly washed with water. The cellulose was then dialyzed against distilled water for 5 d. (Sigma D 9652). The incorporation of the triazinyl derivative was confirmed with the aid of the IR spectrum. A cellulose which had been treated in boiling water for 2 h, and also a cellulose treated as above but without addition of the triazinyl derivative, were used as a comparison.

EXAMPLE 21

Reaction of monochlorotriazinyl-β-cyclodextrin $DS_{Cl}$ 0.4 with cotton

Monochlorotriazinyl-β-cyclodextrin can readily be applied to cotton as described in the following using soda at 90°–98° C. analogously to conventional dyeing techniques of monochlorotriazine reactive dyes. The cotton (styles 407 and 467) was obtained from Testfabrics, Inc. (P.O. Box 420/200, Blackford Avenue, Middlesex, N.J. 08846–0420, U.S.A.).

20 g of cotton were immersed in a solution of 8 g of monochlorotriazinyl-β-cyclodextrin $DS_{Cl}$ 0.4 (40% ash) prepared analogously to Example 2 and 0.5 g of soda in 100 ml of water and heated to 98° C. in the course of 45 min. 2.5 g of sodium chloride in each case were then added to the solution after 15 min. in each case. A further 1.5 g of soda were added at 98° C. Fixing was carried out at this temperature for 1 h. The material was taken from the bath and thoroughly washed with water. By measurement of the bleaching of an alkaline phenolphthalein solution, it was confirmed that cyclodextrin was covalently bonded to the cotton.

Cyclodextrin decolorizes alkaline phenolphthalein solution (see e.g. J. Chem. Soc. Perkin Trans. 2 1992). The coating of the cotton with cyclodextrin can therefore be determined by means of the bleaching of an alkaline phenolphthalein solution (solution in 1N NaOH). Quantification was carried out by a TLC scanner at 572 nm in the reflection position (apparatus: Desaga, Chromatogram Densitometer CD 50), after the dye had been applied to the treated cotton at different concentrations. The untreated cotton, and also cotton which had been treated analogously to the procedure described above, but with β-cyclodextrin instead of the triazinyl derivative, were used as a control.

EXAMPLE 22

Reaction of monochlorotriazinyl-β-cyclodextrin $DS_{Cl}$ 0.4 with filter paper

Several filter papers (30×10 cm) were impregnated with a solution of 2.6 g of monochlorotriazinyl-β-cyclodextrin $DS_{Cl}$ 0.4 (40% ash) prepared analogously to Example 2 and 0.63 g of sodium carbonate in 50 ml of water and dried overnight at 80° C. in a drying oven. The papers were then washed three times with 1.5 l of water after 3 h in each case. As a comparison, a further filter paper was impregnated with the above-mentioned solution without triazine derivative and treated identically.

The paper coated with the cyclodextrin derivative was substantially smoother and firmer than the untreated paper. The treated papers decolorized alkaline phenolphthalein solution substantially more strongly than the untreated papers. The cyclodextrin derivative bonded to the surface was thus still able to complex phenolphthalein.

EXAMPLE 23

Storage stability of monochlorotriazinyl-β-cyclodextrin $DS_{Cl}$ =0.4

5 g of the monochlorotriazinyl-β-cyclodextrin $DS_{Cl}$=0.4 (Example 2) were dissolved in 50 ml of 0.25M phosphate buffer at different pH values, in distilled water and also in distilled water which had been adjusted to pH 1 or pH 14 with 2N HCl or 2N NaOH respectively. The pH of the solutions and the $DS_{Cl}$ value of the cyclodextrin derivative was determined over the course of 46 days. Result: In buffered solutions around pH 8 2-chloro-4-hydroxy-1,3,5-triazinyl-β-cyclodextrin (sodium salt) is particularly stable.

TABLE 1

| | | pH values | | | | | |
|---|---|---|---|---|---|---|---|
| Time [d] | Water | Water pH = 1 | Water pH = 14 | Buffer pH = 5 | Buffer pH = 6 | Buffer pH = 7 | Buffer pH = 8.5 |
| 0 | pH = 7 | pH = 1 | pH = 14 | pH = 5.2 | pH = 6.2 | pH = 7.1 | pH = 8.5 |
| 3 | pH = 3.6 | | | pH = 4.6 | pH = 6.2 | pH = 7.2 | pH = 8.3 |
| 4 | pH = 2.88 | | | pH = 4.4 | pH = 6.2 | pH = 7.18 | pH = 8 |
| 5 | pH = −0.24 | pH = 1 | | pH = 4.3 | pH = 6.19 | pH = 7.16 | pH = 7.6 |
| 10 | pH = −0.27 | | | pH = 1.5 | pH = 6.1 | pH = 7.12 | pH = 7.6 |
| 17 | pH = −0.26 | | pH = 14 | pH = 1.2 | pH = 5.97 | pH = 7.04 | pH = 7.5 |
| 26 | | | | pH = 1.4 | pH = 5.9 | pH = 7 | pH = 7.3 |
| 46 | pH = −0.35 | | | pH = 1.2 | pH = 5.35 | pH = 6.66 | pH = 7 |

TABLE 2

| Time [d] | Water | Water pH = 1 | Water pH = 14 | Buffer pH = 5 | Buffer pH = 6 | Buffer pH = 7 | Buffer pH = 8.5 |
|---|---|---|---|---|---|---|---|
| 0 | 0.4 | 0.4 | 0.4 | 0.4 | 0.4 | 0.4 | 0.4 |
| 3 | 0.34 | | | | | | |
| 5 | 0.21 | 0 | | 0.4 | 0.4 | | |
| 10 | 0.01 | | | 0.05 | | | |
| 17 | 0 | | 0 | | | | 0.37 |
| 26 | | | | 0 | 0.3 | 0.33 | |
| 46 | | | | | | | 0.35 |

EXAMPLE 24

Dialysis of monochlorotriazinyl-β-cyclodextrin $DS_{Cl}=0.4$ 2 g of the monochlorotriazinyl-fl-cyclodextrin $DS_{Cl}=0.4$ (Example 2) were dissolved in 10 ml of distilled water and dialyzed 5 times in the course of 3 days against 10 l of distilled water which had previously been adjusted to pH 8.5 using 2N NaOH. The salts content thereupon fell to less than 0.5% (g/g). The $DS_C$, value after dialysis was 0.35.

EXAMPLE 25

Determination of the incorporation rate of the triazine heterocycle in β-cyclodextrin during the preparation of 2-chloro-4-hydroxytriazinyl-β-cyclodextrin, (Na salt) $DS_{Cl}$ 0.5 by reaction of β-cyclodextrin with the sodium salt of 2,4-dichloro-6-hydroxy-1,3,5-triazine 785 g of the sodium salt of 2,4-dichloro-6-hydroxy-1,3,5-triazine were initially introduced into a 1 l round-bottomed flask as an 8% solution in water and cooled to 10° C. with stirring. A (cooled) solution of 135.76 g of β-cyclodextrin (dry weight) and 13.4 g of sodium hydroxide in 130 g of water was then added dropwise to the well-stirred solution at 10°–15° C. in the course of 1.5 h. This resulted in a theoretical $DS_{Cl}$ value of 0.4. The pH during the dropwise addition was 10–13. After addition of β-CD solution, stirring of the reaction mixture was continued without cooling for a further 4 h until a pH change no longer occurred. A sample of this reaction mixture was then treated with diethylamine to determine the $DS_{Cl}$ value. In this experiment the $DS_{Cl}$ was 0.35. This corresponds to an incorporation of the triazine heterocycle into β-cyclodextrin of 87.5%.

Further experiments were analogously carried out for the determination of the incorporation rates in the case of derivatives having different theoretic $DS_C$, values. The following table gives information about the results.

| $DS_{Cl}$ (Theory) | $DS_{Cl}$ (Product) | Incorporation [%] |
|---|---|---|
| 0.4 | 0.35 | 87.50 |
| 0.6 | 0.49 | 81.67 |
| 0.8 | 0.64 | 80.00 |
| 1 | 0.77 | 77.00 |

EXAMPLE 26

(Comparison Example)

Emulsion Polymerization Without MCT-β-CD 349 g of completely demineralized water, 5.12 g of 20% strength aqueous solution of the sodium salt of dihexyl sulfosuccinate and 6 g of 10% strength acetic acid were initially introduced into a glass reactor. The pH of the initially introduced material was adjusted to 4.0 using 10% strength sodium hydroxide solution. 41 g of styrene and butyl acrylate in each case were coemulsified and heated to 50° C. with stirring. 320 g of water, 55.6 g of 30% strength sodium lauryl polyglycol sulfate, 81.9 g of acrylamide, 369 g of styrene and 369 g of butyl acrylate were preemulsified in a metering container. The pH of the preemulsion were adjusted to pH 4.0 using 10% strength acetic acid. The metering in of solutions of 12.9 g of 40% tert-butyl hydroperoxide in 159 g of water and 8.82 g of hydroxymethanesulfinic acid in 163 g of water was then started simultaneously with stirring. After the start of the reaction, the preemulsion was metered in uniformly over 4 hours. After the course of the preemulsion was complete, the initiator system was still added until the solids content of the dispersion no longer rose. The pH was furthermore kept at pH=4 during this process. The mixture was then cooled. For complete polymerization, 5.3 ml of 10% strength aqueous tert-butyl hydroperoxide solution and 4.3 ml of 10% strength aqueous hydroxy-methanesulfinic acid solution were then added.

A styrene/butyl acrylate copolymer having a styrene content of 48.5% (w/w), a butyl acrylate content of 48.5% (w/w) and 3% acrylamide resulted. The dispersion did not contain a coarse fraction and had a solids content of 49% (w/w), a pH of 3.5 and a mean particle size of 210 nm.

EXAMPLE 27

Emulsion Polymerization in the Presence of MCT-β-CD 349 g of completely demineralized water, 5.12 g of 20% strength aqueous solution of the sodium salt of dihexyl sulfosuccinate and 6 g of 10% strength acetic acid and 30 g of MCT-β-CD (0.4) in 30 ml of water were initially introduced into a glass reactor. The pH of the initially introduced material was adjusted to 4.0 using 10% strength sodium hydroxide solution. 41 g of styrene and butyl acrylate in each case were coemulsified and heated to 50° C. with stirring. 320 g of water, 55.6 g of 30% strength sodium lauryl polyglycol sulfate, 81.9 g of acrylamide, 369 g of styrene and 369 g of butyl acrylate were preemulsified in a metering container. The pH of the preemulsion was adjusted to pH 4.0 using 10% strength acetic acid. The metering in of solutions of 12.9 g of 40% tert-butyl hydroperoxide in 159 g of water and 8.82 g of hydroxymethanesulfinic acid in 163 g of water was then started simultaneously with stirring. After the start of the reaction, the preemulsion was metered in uniformly over 4 hours. The pH of the reaction mixture was kept at pH=4.0 by simultaneous addition of sodium hydroxide solution. After the course of the preemulsion was complete, the initiator system was still added until the solids content of the dispersion no longer rose. The mixture was then cooled. For complete polymerization, 5.3 ml of 10% strength aqueous tert-butyl hydroperoxide solution and 4.3 ml of 10% strength aqueous hydroxy-methanesulfinic acid solution were then added.

A styrene/butyl acrylate copolymer having a styrene content of 48.5% (w/w), a butyl acrylate content of 48.5% (w/w) and 3% acrylamide resulted. The dispersion did not contain a course fraction and had a solids content of 48.1% (w/w), a pH of 4.0 and a mean particle size of 220 nm.

EXAMPLE 28

Emulsion Polymerization in the Presence of MCT-β-CD 349 g of completely demineralized water, 5.12 g of 20% strength aqueous solution of the sodium salt of dihexyl sulfosuccinate and 6 g of 10% strength acetic acid were initially introduced into a glass reactor. The pH of the initially introduced material was adjusted to 4.0 using 10% strength sodium hydroxide solution. 41 g of styrene and butyl acrylate in each case were coemulsified and heated to 50° C. with stirring. 320 g of water, 55.6 g of 30% strength sodium lauryl polyglycol sulfate, 81.9 g of acrylamide, 369 g of styrene and 369 g of butyl acrylate were preemulsified in a metering container. The pH of the preemulsion was adjusted to pH 4.0 using 10% strength acetic acid. The metering in of solutions of 12.9 g of 40% tert-butyl hydroperoxide in 159 g of water and 8.82 g of hydroxymethanesulfinic acid in 163 g of water was then started simultaneously with stirring. After the start of the reaction, the preemulsion was metered in uniformly over 4 hours. After 75% of the preemulsion had been metered in, metering in of a solution of 30 g of MCT-β-CD (0.4) in 30 ml of water was begun such that the addition of preemulsion and MCT-β-CD (0.4) were completed at the same time. The pH of the reaction mixture was kept at pH=4.0 by metering in 10N sodium hydroxide solution. After the course of the preemulsion was complete, the initiator system was still added until the solids content of the dispersion no longer rose. The pH was furthermore kept at pH-4 during this process. The mixture was then cooled. For complete polymerization, 5.3 ml of 10% strength aqueous tert-butyl hydroperoxide solution and 4.3 ml of 10% strength aqueous hydroxy-methanesulfinic acid solution were then added.

A styrene/butyl acrylate copolymer having a styrene content of 48.5% (w/w), a butyl acrylate content of 48.5% (w/w) and 3% acrylamide resulted. The dispersion did not contain a course fraction and had a solids content of 48.8% (w/w), a pH of 3.9 and a mean particle size of 260 nm.

EXAMPLE 29

Emulsion Polymerization in the Presence of MCT-β-CD 349 g of completely demineralized water, 5.12 g of 20% strength aqueous solution of the sodium salt of dihexyl sulfosuccinate and 6 g of 10% strength acetic acid were initially introduced into a glass reactor. The pH of the initially introduced material was adjusted to 4.0 using 10% strength sodium hydroxide solution. 41 g of styrene and butyl acrylate in each case were coemulsified and heated to 50° C. with stirring. 320 g of water, 55.6 g of 30% strength sodium lauryl polyglycol sulfate, 81.9 g of acrylamide, 369 g of styrene and 369 g of butyl acrylate were preemulsified in a metering container. The pH of the preemulsion was adjusted to pH 4.0 using 10% strength acetic acid. The metering in of solutions of 12.9 g of 40% tert-butyl hydroperoxide in 159 g of water and 8.82 g of hydroxymethanesulfinic acid in 163 g of water was then started simultaneously with stirring. After the start of the reaction, the preemulsion was metered in uniformly over 4 hours. After the course of the preemulsion was complete, the initiator system was still added until the solids content of the dispersion no longer rose. A solution of 30 g of MCT-β-CD (0.4) in 30 ml of water was then metered in and adjusted with 5N sodium hydroxide solution to pH=8. The reaction mixture was kept at 80° C./pH=8 for 30 minutes, and during a further 30 minutes the pH was allowed to fall to pH=4. The mixture was then cooled. For complete polymerization, 5.3 ml of 10% strength aqueous tert-butyl hydroperoxide solution and 4.3 ml of 10% strength aqueous hydroxymethanesulfinic acid solution were then added.

A styrene/butyl acrylate copolymer having a styrene content of 48.5% (w/w), a butyl acrylate content of 48.5% (w/w) and 3% acrylamide resulted. The dispersion did not contain a course fraction and had a solids content of 49.5% (w/w), a pH of 4.0 and a mean particle size of 350 nm.

TABLE 4

Composition of the polymer dispersions:

| Example | Copolymer | Comonomer | MCT-β-CE (0.4) | Tg [0° C.] | FG [%] | pH | Particle size nm |
|---|---|---|---|---|---|---|---|
| 26 | st/BA/AA | 48.5/48.5/3 | — | 20 | 49.0 | 3.5 | 210 |
| 27 | st/BA/AA | 48.5/48.5/3 | 30 g | 20 | 48.1 | 4.0 | 220 |
| 28 | st/BA/AA | 48.5/48.5/3 | 30 g | 15 | 48.8 | 3.9 | 260 |
| 29 | st/BA/AA | 48.5/48.5/3 | 30 g | 10 | 49.5 | 4.0 | 350 |

EXAMPLE 30

Preparation of Nylon Modified With Cyclodextrin 10 g of nylon 6/6 (Fluka, CH-9471 Buchs, Order No. 74712) was finely ground and suspended in 40 ml of dimethylformamide. After addition of 1.0 g of sodium carbonate and 5 g of MCT-β-CD (0.4), dissolved in 10 ml of DMF, the mixture was heated to 80° C. and kept at this temperature for 1 hour. For work-up, the nylon granules were filtered off, suspended in water and filtered. The incorporation of the triazine derivative was determined by $^{13}$C-NMR.

EXAMPLE 31

Preparation of Polyvinyl Alcohol Modified With Cyclodextrin 10 g of polyvinyl alcohol (Aldrich, Steinheim, Order No. 34, 158-4) were suspended in 20 ml of 10% strength sodium hydroxide solution, stirred for 1 hour and filtered off. The resin was stirred for 15 minutes in a 10% strength solution of MCT-β-CD (DS 0.4) in water. It was then cooled and rinsed with water.

The polymer treated in this way showed complexing properties. For example, 1 g of the modified polyvinyl alcohol complexed 1.1 mg of hydrocortisone from an aqueous hydrocortisone solution (starting concentration 1.6 mg in 10 ml). The polyvinyl alcohol used as the starting material showed no complexing behavior.

EXAMPLE 32

Preparation of Polyvinyl Alcohol Modified With Cyclodextrin 10 g of polyvinyl alcohol (Aldrich, Steinheim, Order No. 34, 158-4) were suspended in 20 ml of 10% strength sodium hydroxide solution, stirred for 1 hour and filtered off. The resin was stirred for 15 minutes in a 10% strength solution of MCT-β-CD (DS 0.4) in water. It was then cooled and rinsed with water.

The polymer treated in this way showed complexing properties. For example, 1 g of the modified polyvinyl alcohol complexed 1.1 mg of hydrocortisone from an aqueous hydrocortisone solution (starting concentration 1.6 mg in 10 ml). The polyvinyl alcohol used as the starting material showed no complexing behavior.

EXAMPLE 33

Preparation of Polyvinyl Alcohol Modified With Cyclodextrin 10 g of polyvinyl alcohol (Aldrich, Steinheim, Order No. 34, 158-4) were suspended in 20 ml of 10% strength sodium hydroxide solution, stirred for 1 hour and filtered off. The resin was stirred for 15 minutes in a 10% strength solution of MCT-γ-CD (DS 0.4) in water. The resin was then filtered off and fixed at 80° C. in a drying oven. It was finally cooled and rinsed with water.

The polyvinyl alcohol modified with MCT-γ-CD (DS 0.4) showed complexing properties. For example, 1 g of the modified polyvinyl alcohol complexed 1.4 mg of hydrocortisone from an aqueous hydrocortisone solution (starting concentration 1.6 mg in 10 ml). The polyvinyl alcohol used as the starting material showed no complexing behavior.

EXAMPLE 34

Preparation of Polyethyleneimine Modified With Cyclodextrin 20 g of polyethyleneimine (50% strength aqueous solution, Fluka, CH-9471 Buchs, Order No. 03880), 10 g of MCT-β-CD (0.4) and 2 g of sodium carbonate were heated at 98° C. for 4 hours. The product had a gelatinous consistency and decolorized alkaline phenolphthalein solution, which confirms the complexing properties of the product (J. Chem. Soc. Perkin Trans. 2, 1992).

EXAMPLE 35

Preparation of Polymethacrylate Modified With Cyclodextrin 10 ml of 2-hydroxyethyl methacrylate dissolved in 10 ml of water and 3.2 g of sodium hydroxide, dissolved in 10 ml of water, were simultaneously added dropwise at 10° to 20° C. to a solution of 40 mg of MCT-β-CD (0.4) in 60 ml of water (time 1 hour). The solution was dialyzed, the pH being kept at pH=8 using a phosphate buffer.

405 ml of n-decane are treated under $N_2$ protective gas with 4.05 g of the emulsifier "Gafac RM 510" from GAF (Deutschland) GmbH, 5020 Frechen, (complex phosphoric acid ester) in a cylindrical 1 l glass vessel having an impeller stirrer and heating mantle and the mixture is stirred at 70° C. and a stirrer speed of 750 rpm.

The solution prepared above was treated with 23 g of 5% strength (w/v) aqueous potassium peroxodisulfate solution. This solution is poured with stirring into the n-decane phase. The resulting emulsion is stirred at 75° C. and 750 rpm for 2.5 hours, bead-shaped polymer being formed.

The suspension obtained is cooled to 25° C. and the polymeric solid is filtered off, and washed with 100 ml of n-decane, 150 ml of ethanol, twice with 150 ml of water each time and finally again with 150 ml of ethanol. The polymer is dried in vacuo at 75° C. for 6 hours.

42 g (yield: 90%) of polymer are obtained in the form of uniform beads having a mean particle size of 25 μm. In water, the polymer shows a swelling of 1.9 g/g and a gel bed volume of 4.0 ml/g.

EXAMPLE 36

Preparation of Chitosan Modified With Cyclodextrin 10 g of chitosan (low molecular weight, Fluka, CH-9471 Buchs, Order No. 22741), 10 g of MCT-β-CD (0.4) and 2 g of sodium carbonate were heated at 98° C. for 4 hours. The product had gelatinous consistency and decolorized alkaline phenolphthalein solution, which confirms the complexing properties of the product (J. Chem. Soc. Perkin trans. 2, 1992).

EXAMPLE 37

Emulsion Polymerization With MCT-β-CD 393 g of demineralized water, 6 g of a nonylphenol polyglycol ether (having an average 23 EO units), 2.4 g of a $C_{15}$-alkylsulfonate, 4.5 g of sodium vinyl sulfonate, 50 g of MCT-β-CD (DS 0.4), 4 g of acrylamide and 1.7 g of acrylic acid were initially introduced into a reactor which was provided with a reflux condenser, stirrer, metering-in possibilities, nitrogen inlet, and also heating and cooling possibilities, and the pH was adjusted to 3.5 using concentrated ammonia solution. 402 g of vinyl acetate, 170 g of vinyl laurate and 36 g of 2-ethylhexyl acrylate were coemulsified in this solution. The mixture was heated to 50° C. and the addition of a 3.5% strength ammonium persulfate solution (10.5 g/h) and a 2% strength sodium formaldehyde sulfoxylate solution (10.5 g/h) was begun. After the start of the reaction, a mixture of 134 g of 2-ethylhexyl acrylate, 101 g of methyl methacrylate, 15 g of hydroxyethylate and 2.5 g of acrylic acid (addition 1) and a solution of a further 6 g of the nonylphenol polyglycol ether and 18 g of N-methylacrylamide in 36 g of demineralized water were continuously metered in over a period of 4.5 hours. The addition of the ammonium persulfate solution and of the sodium formaldehyde sulfoxylate solution was then continued for a further 2.5 hours.

After cooling, a stable dispersion was obtained having a solids content of 61.0%, a K value (according to Fikentscher, 1% in tetrahydrofuran/water 93:7 (v/v) of 101, and a viscosity of 22,000 mPa.s (Brookfield, 20 rpm).

EXAMPLE 38

Emulsion Polymerization Without Use of MCT-β-CD

The experimental procedure was carried out as in Example 37, the addition of 50 g of MCT-β-CD (DS 0.4) being dispensed with, however.

After cooling, a stable dispersion was obtained having a solids content of 60.5%, a K value (according to Fikentscher, 1% in tetrahydrofuran/water 93:7 (v/v) of 111, and a viscosity of 19,000 mPa.s (Brookfield, 20 rpm).

EXAMPLE 39

The experimental procedure was carried out as in Example 38 with the modification that, after addition of monomer for 3.5 hours, 30 g of MCT-β-CD (DS 0.4) dissolved in 70 g of demineralized water were additionally added over the course of 1 hour.

After cooling, a stable dispersion is obtained having a solids content of 53%, a K value (according to Fikentscher, 1% in tetrahydrofuran/water 93:7 (v/v) of 110, and a viscosity of 15.000 mPa.s (Brookfield, 20 rpm).

The application testing of the dispersions from Examples 37 to 39 as contact adhesive was carried out as follows:

Stability to peeling (at 23° C. and 50% relative humidity)

The aqueous contact adhesives according to the examples and the dispersions of the comparison examples were applied to beech rods 20×2 cm² in size in a film thickness of 100 μm wet, corresponding to 75 g/m² dry, and dried for 45 minutes under normal climatic conditions (23° C., 50% relative atmospheric humidity). A PVC strip having an area of 15.5×2 cm² was then applied to the beech rods such that the adhesive coatings came into contact with one another and then pressed on with a steel roller 3.5 kg in weight by rolling back and forth five times. Sticking on was carried out such that the free end of the PVC strip projected on one transverse side of the beech rod. A weight of 300 g was immediately fixed to the free end of the PVC strip and the beech rod was fixed with the PVC strip on the bottom in such a manner that an angle of 90° was established between the stuck and the free end of the PVC strip. Fixing of the weight was arranged such that the force acted uniformly over the entire width of the PVC strip. The time was determined in which the PVC strip under the constant loading of 300 g peeled off on a stretch of 10 cm. To this end, after a test time of one, three and seven days the peeled stretch was measured and the quotient of test time in minutes and peel stretch in centimeters was formed. Table 7 shows the measurements of peel stability after one, three and seven days. The values indicated are mean values from three individual measurements in each case.

Shear stability (at 23° C. and 50% relative humidity)

The aqueous contact adhesives according to the examples and the dispersions of the comparison examples were applied wet to beechwood specimens having dimensions of 7×2×0.5 cm in a film thickness of 100 μm and dried for 20 minutes under normal climatic conditions. Two specimens were then placed together such that the adhesive coatings came into contact with one another and formed an overlapped adhesive surface of 4 cm². The specimens fixed in this way were pressed together for 10 seconds using a pressure of 0.2N/mm². The stuck articles produced in this manner were stored for 24 hours under normal climatic conditions. The specimens were then fixed vertically and loaded with a weight of 2 kg at an angle of 180°. The time elapsed in minutes until breakage of the adhesive bond was recorded. Table 6 shows the measurements for the shear stability. The values indicated are mean values from three individual measurements in each case.

Heat shear stability (as a function of the temperature (T))

The aqueous contact adhesives according to the examples and the dispersions of the comparison examples were applied to beechwood specimens having dimensions of 7×2×0.5 cm in a film thickness of 100 μm and dried for 20 minutes under normal climatic conditions. Two specimens were then placed together such that the adhesive coatings came into contact with one another and formed an overlapped adhesive area of 4 cm². The specimens fixed in this way were pressed together for 10 seconds using a pressure of 0.2N/mm². The stuck articles produced in this manner were stored for 24 hours under normal climatic conditions. The specimens were then fixed vertically in a drying oven prewarmed to 50° C. and loaded at an angle of 180° with a weight of 2 kg. Every 60 minutes the temperature of the drying oven was increased by 25° C. The temperature on breakage of the adhesive bond and the elapsed time in minutes were recorded. Table 6 shows the measurements for heat shear stability. The values indicated are mean values from three individual measurements. Tensile strength (at 23° C. and 50% relative humidity)

The aqueous contact adhesives according to the examples and the dispersions of the comparison examples were applied wet to beechwood specimens having dimensions of 12.3×3×0.3 cm in a film dried for 30 minutes under normal climatic conditions. Two specimens were then placed together such that the adhesive coatings came into contact with one another and formed an overlapped adhesive area of 9 cm². The specimens attached in this way were pressed together for 10 seconds using a pressure of 0.8 N/mm². The resistance to breaking in N/mm² of the specimens produced in this manner was determined, immediately and after storage for three days under normal climatic conditions, by means of a tensile testing machine (material testing machine 1445 from Zwick) at a speed of 50 mm/min. Table 5 shows the measurements for the tensile strength after appropriate storage. The values indicated are mean values from six individual measurements in each case.

Peel strength (at 23° C. and 50% relative humidity)

The aqueous contact adhesives according to the examples and, the dispersions of the comparison examples were applied wet, corresponding to 75 g/m² dry, to PVC strips (DIN PVC coating) 20×2 cm² in size and to beech rods 15.5×2 cm² in size in a film thickness of 100 μm and dried for 45 minutes under normal climatic conditions (23° C., 50% relative atmospheric humidity). The PVC strip having an area of 155×2 cm² was then applied to the beech rod such that the adhesive coatings came into contact with one another and were then pressed on with a steel roller 3.5 kg in weight by rolling back and forth five times. The specimens produced in this manner were mounted, immediately or after storage for 3 days under normal climatic conditions, in a tensile testing machine (material testing machine 1445 from Zwick) and separated by pulling off at an angle of 90° at a speed of 300 min/cm. The peel strength is the force to be applied for this in N/cm. Table 5 shows the measurements for the peel strength after appropriate storage. The values indicated are mean values from three individual measurements.

Results of the tests

The dispersions according to Examples 37 and 39 and the comparison dispersion 33 were tested according to the above methods. The results are described in Table 5, 6 and 7.

TABLE 5

TENSILE AND PEEL STRENGTH TESTS

| Example | Tensile Strength wood/wood (N/mm²) room temperature (start) | Room Temperature (3 d) | Peel Strength PVC/wood (N/cm) room temperature (start) | Room Temperature (3 d) |
|---|---|---|---|---|
| 37 | >8000 | 2.18 | 8.35 | 18.30 |
| 39 | >8000 | 2.75 | 6.00 | 13.60 |
| 38 | >8000 | 2.20 | 10.10 | 13.10 |

TABLE 6

SHEAR ABILITY AND PEEL STABILITY TESTS

| Example | Shear Stability wood/wood normal climatic conditions (min) | (T) (T/min) | Peel Stability PVC/wood (min/cm) room temperature |
|---|---|---|---|
| 37 | >8000 | 50/50 | 2120 |
| 39 | >8000 | 75/14 | 6315 |
| 38 | >8000 | 50/48 | 1133 |

TABLE 7

CHRONOLOGICAL DEVELOPMENT OF PEEL STABILITY

| | Peel stability | | | | | |
|---|---|---|---|---|---|---|
| | 1 day | | 3 days | | 7 days | |
| Example | cm | min/cm | cm | min/cm | cm | min/cm |
| 37 | 1.1 | 1275 | 2.1 | 1866 | 4.3 | 2120 |
| 39 | 1.1 | 1600 | 1.6 | 3005 | 1.7 | 6315 |
| 38 | 5.2 | 277 | 6.5 | 665 | 8.9 | 1133 |

EXAMPLE 40

An aqueous solution consisting of the following constituents is added to a pressure apparatus having a stirrer, jacket heating and metering pumps: 10,700 g of water, 142 g of sodium acetate×3 $H_2O$, 1760 g of a 20% strength by weight aqueous solution of nonylphenyl ethoxylated with 30 mol of ethylene oxide, 13,700 g of a 5% strength by weight aqueous hydroxyethylcellulose solution (HEC solution) (viscosity of the 2% strength by weight aqueous solution 300 mPa.s), 572 g of a 30% strength by weight aqueous sodium vinylsulfonate solution, 3.0 g of a 10% strength by weight aqueous ferric ammonium sulfate solution and 150 g of MCT-β-CD. The pH of the solution is adjusted to 4 using 10% strength by weight acetic acid.

The apparatus is freed from atmospheric oxygen and ethylene is forced into the apparatus. At an ethylene pressure of 20 bar, 5900 g of vinyl acetate and 10% of a reducing agent solution of 27.1 g of Rongalit in 2 l of water are metered in. The mixture is heated to an internal temperature of 60° C. and at the same time the ethylene pressure is increased to 40 bar. 10% initiator solution of 27.1 g of tert-butyl hydroperoxide in 2000 g of water are then metered in at an internal temperature of 60° C. and the mixture is cooled to dissipate the heat of reaction, then 24,600 g of vinyl acetate, the remaining 90% of the reducing agent solution and the remaining 90% of the initiator solution are metered in, the ethylene pressure being kept at 40 bar. A solution of 3432 g of sodium persulfate in 300 g of water is then metered in and the internal temperature is raised to 80° C. and kept at this temperature for 1 hour. The main part of the unreacted ethylene is then outgassed with stirring and collected in a gasometer and 2 l of water are added. Then, while applying a vacuum, 2.6 l of water are distilled off in the course of 2 h, whereby the residual vinyl acetate content of the dispersion is reduced to 0.05% by weight, based on the dispersion. By repeating the separation process a residual vinyl acetate content of 0.012% by weight is achieved.

Characterization of the resulting copolymer dispersion

| | |
|---|---|
| Solids content (% by weight) | 55 |
| pH (elecrode measurement) | 4.5 |
| viscosity (mPa · s) | 1500 |
| minimum film formation temperature (MFT) °C. | <0 |
| K value (Fikentscher) | 80 |

EXAMPLE 41

The experiment was carried out as in Example 40 with the modification that 1 hour before the end of vinyl acetate addition 150 g of MCT-β-CD in 350 g of water are metered in and in return no MCT-β-CD is initially introduced.
Dispersion data: solids content (% by weight) 53 otherwise as in Example 40

EXAMPLE 42

(Comparison Example)

The experiment was carried out as in Example 40 only without MCT-β-CD.

Dispersion data as in Example 40 only viscosity (mPa.s) =500.

Application testing of Examples 40 to 42 as binders for the production of interior paints:

Outline recipe for the highly filled interior emulsion paints prepared for comparative tests

| Water | Parts by weight |
|---|---|
| Methylhydroxyethylcellulose | 3110 |
| (2% strength aq. soln. visc. 3000 mPa · s) | 60 |
| Na salt of a polyacrylic acid of MW 2000 | 35 |
| (30% strength by weight aq. soln.) | |
| Sodium polyphosphate | 150 |
| (10% strength by weight aq. solution) | |
| Sodium hydroxide solution | 20 |
| (10% strength by weight solution) | |
| Preservative | 15 |
| Antifoam | 20 |
| Talc | 600 |
| Kaolin | 400 |
| Titanium dioxide | 700 |
| Calcium carbonate | 2300 |
| (particle size 90% by weight <2 μm) | |
| Calcium carbonate | 1500 |
| (particle size 50% by weight <2 μm) | |
| Polymer dispersion | 1090 |
| (55% strength by weight) | |
| Total quantity emulsion paint | 10,000 |

Preparation of interior emulsion paints according to the above outline recipe

The powdered methylhydroxycellulose is scattered into the water and dissolved with stirring, and then the solutions of the Na salts of polyacrylic acid and polyphosphoric acid and the 10% strength by weight sodium hydroxide solution are added with stirring. The preservative and the antifoam are added to the viscous solution obtained. Titanium dioxide and the calcium carbonate types are next added with stirring by means of a dissolver at a stirring speed of 2000 rpm. The mixture is dispersed for a further 20 min at 5000 rpm, the temperature of the pigment/filler paste rising to 60° C. It is allowed to cool to 30° C. The pH is 9.3.

In order to investigate the parameters of the synthetic copolymer dispersions described, 891 g of the pigment/filler paste are in each case stirred with 109 g of the 55% strength by weight synthetic copolymer dispersion to be tested in each case (3 min Lenard stirrer at 1500 rpm). After one day the emulsion paints thus prepared are applied using a 300 μm doctor blade to Leneta film, the coats of paint are brushed off after drying for 5 days at 23° C. and 50% rel. atmospheric humidity using the Gardner apparatus and the number of double brush strokes (DBS) which the paint withstands are determined according to Gardner. Increasing DBS numbers here mean increasing paint quality. The results can be seen in Table 8.

TABLE 8

| Copolymer dispersion from Example No. | Number of double brush strokes (DBS) according to Gardner which the paint withstands | Peeling Off of the paint | Repetition of the measurements after heat treatment of the paint (4 hours, 60° C.) | |
|---|---|---|---|---|
| | | | DBS according to Gardner | Peeling Off of the paint |
| 40 | 2100 | no | 1800 | no |
| 41 | 3120 | no | 3080 | no |
| 42 | 1240 | severe | 1160 | severe |

Application examples for use as additives to hydraulic binders.
Application studies In the tests for determining bending tensile strengths, compressive strengths and adhesive tensile strengths a DIN mortar according to DIN 1164 was employed. In all tests a polymer/cement value of p/c=0.15 (p/c=0.15 means 15% by weight dispersion powder to amount of cement employed) was used.

Recipe for the DIN mortar according to DIN 1164:

| | |
|---|---|
| Portland cement PZ-35F | 900 g |
| Normal sand (=2 bags) | 2700 g |
| Silicone defoamer S-860 (Wacker-Chemie) | 7.2 g |
| Water | 225 g |
| Dispersion from Examples 27–29 | 250 g |

The powdered recipe constituents are mixed to a dry mortar. The dry mortar was first made into a paste with water (50% of the amount), then the dispersion was stirred in and adjusted using the remaining water to the water/cement value (w/c) of 0.40 (mortar without dispersion solid). For preparation of the comparison mortar from the dispersion of Example 26, the water/cement value had to be increased to 0.45 in order to obtain a processable mortar.

The testing of the raw mortar properties shows the greatly water-saving or liquefying action of the dispersions according to the invention. The results are compiled in Table 9.

TABLE 9

| Raw mortar data | | | | |
|---|---|---|---|---|
| | | | Degree of spread | |
| Mortar from dispersion of Example | p/c | Air content | % without vibrating [cm] | after vibrating [cm] |
| without dispersion | 0.45 | 3.7 | 10.0 | 13.0 |
| Example 26 | 0.45 | 4.2 | 10.0 | 16.5 |
| 27 | 0.40 | 3.7 | 12.5 | 18.0 |
| 28 | 0.40 | 4.3 | 15.0 | 21.0 |
| 29 | 0.40 | 4.0 | 13.0 | 19.0 |

For the testing of bending tensile strengths and compressive strength, mortar prisms having the measurements 160× 40×40 mm$^3$ were prepared according to DIN 1164. Stripping of the specimens was carried out after 2 days. The form was covered during this time. The results of the bending tensile strength and compressive strength tests are compiled in Table 10.

TABLE 10

| Strengths after storage for 28 days in a wet climate (23° C., 50% relative humidity) | | |
|---|---|---|
| Example | Bending tensile strength (N/mm$^2$) | Compressive strength (N/mm$^2$) |
| without dispersion | 7.88 ± 0.35 | 47.2 ± 2.2 |
| 26 | 8.92 ± 0.24 | 89.8 ± 1.0 |
| 27 | 11.95 ± 0.54 | 46.0 ± 1.0 |
| 28 | 13.60 ± 0.37 | 48.1 ± 1.1 |
| 29 | 12.97 ± 0.86 | 49.5 ± 1.3 |

For testing the adhesive tensile strength, the mortars were applied with a trowel using a template in a 4 mm layer thickness to concrete path slabs (B 550, 40×40 cm$^2$) stored in a normal climate (23° C., 50% relative atmospheric humidity). The slabs were stored in a normal climate. One day before the date of the test, 6 specimens per slab were drilled out with a core drill and round pull-off cramps (diameter 55 mm, thickness 10 mm) were glued thereto using a two-component adhesive. Pulling off took place using a pull-off apparatus having a load-increasing rate of 250 N/sec.

The results of the adhesive tensile strength are compiled in Table 11.

TABLE 11

| Adhesive tensile strengths after storage for 28 days in a normal climate (23° C., 50% relative humidity) | |
|---|---|
| Example | Adhesive tensile strength (N/mm$^2$) |
| without dispersion | 1.38 ± 0.11 |
| 26 | 1.81 ± 0.14 |
| 27 | 2.90 ± 0.16 |
| 28 | 3.45 ± 0.14 |
| 29 | 3.10 ± 0.15 |

EXAMPLE 43

5200 g of water, 97 g of the sodium salt of a sulfated nonylphenol polyglycol ether having about 25 glycol units, 48 g of an alkylsulfonate having about 15 C atoms, 21 g of acrylamide, 70 g of acrylic acid and 250 g of MCT-β-CD (DS 0.4) were initially introduced into a 16 l stirred autoclave, and 2160 g of vinyl acetate and 840 g of vinyl laurate were coemulsified.

The mixture was heated to 50° C. and saturated to 60 bar with ethylene. Initiation of polymerization was carried out by simultaneous addition of 80 ml/h in each case of 10% strength ammonium persulfate solution and 5% strength sodium formaldehyde sulfoxylate solution and the polymerization was continued by simultaneous addition of 40 ml/h of the two solutions in each case. After initiation had taken place (detectable by a pressure increase of about 2 bar), a mixture of 2280 g of vinyl acetate, 600 of vinyl laurate and 400 g of 2-hydroxyethyl acrylate and also a solution of 285 g of 5 the above nonylphenol polyglycol ether sulfate, 120 g of acrylic acid and 18 g of concentrated ammonia solution in 530 g of water were metered in during the course of 8 h. After about 2 h, the ethylene pressure had fallen to 60 bar and for the further maintenance of this pressure ethylene had to be reinjected continuously.

After the end of addition of monomer mixture and emulsifier solution, the ethylene pressure was maintained for a further 1.5 h and the addition of the initiator solutions for a further 6 h. The ethylene pressure fell during the course of this to 25 bar.

After cooling and releasing the pressure, a dispersion resulted having 56.6% solids content, a viscosity of 450 mPa.s (Epprecht rheometer, STV, CIII), a K value of 84 (according to Fikentscher, Cellulosechemie (Cellulose chemistry), Volume 13, 58, (1932); measured in 1% strength tetrahydrofuran solution) and an ethylene content of the solid fraction of 32%.

EXAMPLE 44

The experiment was carried out as described in Example 43, but without MCT-β-CD in the initially introduced material, but with addition of 290 g of MCT-β-CD (DS 0.4) in a 30% strength aqueous solution (% by weight) during the course of 1 h as a separate addition with start of the addition after addition of monomer for 7 h.

Dispersion data: 54.0% solids content, viscosity 630 m/Pa.s, K value: 91 and ethylene content: 31%

EXAMPLE 45

The experiment was carried out as described in Example 43, but completely without MCT-β-CD.

Dispersion data: 56.7% solids content, viscosity 630 mpa.s, K value: 94 and 30.5% ethylene content.

Test methods for the dispersions according to Examples 43 to 45.

The following table of measurements indicates results of the testing of heat peel stability, surface tackiness, peel strength (adhesive force) and shear stability of adhesive coatings prepared using the dispersions according to the invention. The expression "adhesive strips" is understood as meaning strips of flexible, film-like support material coated with a film of a dispersion according to the invention.

The following determination methods were used:

a) Heat peel stability

An adhesive strip 5×8 cm 2 in size was placed with an area of 5×5 cm$^2$ on a lead crystal plate and pressed on using a steel roller 2.2 kg in weight covered with silicone rubber by rolling back and forth two times. Sticking-on was carried out such that the free end of the adhesive strip projected on one longitudinal side of the glass plate. A weight of 50 g was immediately attached to the free end of the adhesive strip and the glass plate was fixed with the stuck-on adhesive strip on the bottom in a drying oven preheated to 50° C. in a manner such that an angle of 90° C. was established between the stuck and free end of the adhesive strip. The fixing of the weight was arranged such that the force acted uniformly over the entire width of the adhesive strip. The time was determined in which the adhesive strip was peeled off at 50° C. under the constant loading of 50 g on a stretch of 1 cm. To this end, the peeled stretch was measured after an appropriate test time and the quotient of test time in minutes and peel stretch in centimeters was formed. The values indicated are mean values from three individual measurements in each case.

b) Surface tackiness

An adhesive strip 20 cm long 2.5 cm wide (support material: polymer plasticizer-containing PVC, 0.1 mm thick) was clamped suspended vertically in the form of a "loop" with the adhesive layer outwards in the upper jaws of a tensile test machine. The "loop" was then placed onto a horizontally fixed, carefully cleaned glass plate without application of pressure in a length of approximately 3 cm by driving together the two jaws of the tensile test machine vertically at a speed of 100 mm/minute. The pulling-off of the adhesive strip from the glass surface then took place immediately at the same speed. The highest force needed for the pulling-off of the "loop" is taken as a measure of the surface tackiness.

The value indicated is the mean value from five individual measurements, a fresh adhesive strip and a fresh glass surface being used each time.

c) Peel strength (adhesive force)

An adhesive strip 20 cm long and 2.5 cm wide was placed onto a carefully cleaned lead crystal plate starting from one end and avoiding the formation of bubbles in a length of about 12 cm. By rolling 5 times (back and forth) using a steel roller 2.2 kg in weight covered with silicone rubber the adhesive strip was pressed on. After storage for 3 minutes or 24 hours in an air-conditioned room at 23° C. and 50% relative atmospheric humidity, the adhesive strip was pulled off at a speed of 300 mm/minute at a 1801 angle over a length of 5 cm. The average force needed for this was measured.

The values indicated are mean values from 5 individual measurements in each case. For all measurements, the adhesive dispersions tested were applied to the support films using a doctor blade in such a thickness that, after drying, a uniform polymer layer of 24 to 26 g/m$^2$ remained.

The glass surfaces used in the investigations were cleaned by mechanical removal of visible soiling with the aid of water and, if appropriate, cleaning agents and subsequent storage in an acetone bath. Before the use of the test surfaces cleaned in this way, the plates were stored for at least 48 hours in a normal climate of 23° C./50% rel. atmospheric humidity.

TABLE 12

Test values of dispersion coatings of about 25 μ dry film thickness on 100 μ thick soft PVC films

| Dispersion Example No. | Heat Peel stability | Surface tackiness (N/2.5 cm) | Peel strength (N/2.5 cm on glass with an adhesion time of | |
|---|---|---|---|---|
| | | | 8 min. | 24 hours) |
| 43 | 8000 | 7.4 | 9.0 | 17.9 |
| 44 | 8500 | 6.8 | 9.5 | 18.4 |
| 45 | 8200 | 8.3 | 8.7 | 18.1 |

EXAMPLE 46

Finishing of a cotton T-shirt using MCT-β-CD 0.5

35 g of MCT-d-CD DS 0.438, 5 g of sodium carbonate 14 g of sodium chloride 700 g of water 70 g of material MCT-β-CD and sodium carbonate were dissolved in water and the T-shirt was half-immersed. The liquor was heated to 98° C. in the course of 45 min. During this process, 7 g of sodium chloride were added in each case after 15 min and 30 min. The temperature of 98° C. was held for 1 h. The T-shirt was taken from the liquor, cooled and washed thoroughly several times with hot and cold water.

The T-shirt finished in this way with MCT-β-CD was worn on the skin. On the side of the T-shirt finished with the cyclodextrin derivative, distinctly less perspiration odor could be detected. After wearing, the T-shirt was washed in the washing machine a total of 4 times at 40° C. using a normal detergent and worn again. The ability of the material to bind perspiration odor by complexation was still present even after the 4th washing process. The cyclodextrin derivative consequently had to be covalently bonded.

EXAMPLE 47

Finishing of a cotton T-shirt with MCT-β-CD 0.5

20 g of MCT-β-CD DS 0.4

1 g of sodium carbonate 4 g of sodium chloride 200 g of water 109 g of material

MCT-β-CD and sodium carbonate were dissolved in 200 ml of water. The damp, well wrung-out cotton T-shirt was then half-inmersed in this solution. After it had become saturated with the liquor the T-shirt was put into a plastic bag and temperature-controlled at 60° C. for 4 h in a drying oven. It was then washed thoroughly several times with hot and cold water.

The T-shirt finished in this way with MCT-β-CD was worn. On the side of the T-shirt finished with the cyclodextrin derivative, distinctly less perspiration odor was to be detected.

EXAMPLE 48

Coating of cotton with MCT-β-CD 0.4

1) 1.024 g of sodium carbonate were dissolved in 45 ml of water. A total of 5 g of MCT-P-CD 0.4 (anhydrous) were added and the mixture was stirred until a clear solution resulted.

2) 1 g of cotton material (style 407, see Example 21) was then immersed in this previously prepared solution for 5 min using the tweezers whilst stirring continuously.

3) The material was then smoothed out on a PVC board, about 50×35 cm, and squeezed off with a VA tube with rolling (the squeezed-off liquid was constantly removed with a cloth) until the weight of the material virtually no longer changed. With 1 g of material employed and a 10% strength MCT solution, the weight of the damp material was about 1.5 g.

4) The material was then fixed for 60 min at 90°–100° C. in a recirculating air oven.

5) A washing process was then carried out. To this end, the material fixed with MCT-β-CD was washed for 3 min under running hot water and 2 min under running cold water (in between constantly squeezed out).

6) The wet material was then placed over a plastic stopper in the Petri dish and dried for 60 min at 90° C. in a drying oven.

7) The dried material was weighed. The weight increase was 33 mg.

8) Using the dry, coated material the hydrocortisone test described in Example 29 was then carried out.

Items 2–6 can be repeated any desired number of times in order to increase the coating of the material with MCT-β-CD.

EXAMPLE 49

Complexation of hydrocortisone by MCT-coated cotton fabric

A) Preparation of a hydrocortisone stock solution

1) For the stock solution, 500 ml of fully demineralized water were shaken on a laboratory shaker with 200 mg of hydrocortisone for about 16 h in a well-sealed bottle. The mixture was then first filtered through a fluted filter and then through a sterile filter in order to remove undissolved fine fractions.

2) Of this clear solution, 450 ml were filled into a 500 ml measuring flask and made up to the mark with fully demineralized water (=stock solution).

3) With the aid of HPLC, the content of dissolved hydrocortisone in this stock solution was determined. It was 0.253 mg/ml.

B) Complexation of hydrocortisone by MCT-coated cotton fabric 1) 5 ml of the stock solution containing 5×0.253 mg 1.265 mg of hydrocortisone and 5 ml of fully demineralized water were pipetted into a 30 ml widenecked flask using a measuring pipette. 1.033 g of MCT-β-CD-coated, dry material from Example 28 were folded and pressed into the solution with a spatula such that the material was thoroughly soaked.

2) It was then shaken on a laboratory shaker at RT for 18 h.

3) The liquid was decanted via a funnel into a 50 ml measuring flask, and the material was carefully drawn into the funnel using the tweezers and well squeezed off using a pestle.

4) The material was then washed in a beaker. To this end, it was forced into 5 ml of completely demineralized water using the tweezers and then placed in an ultrasonic bath for 5 min. 5) The wash water was in turn decanted into the measuring flask, and the material was carefully drawn out of the beaker and again squeezed out above the measuring cylinder using the pestle in a funnel.

6) The measuring flask was then filled to the mark with fully demineralized water.

7) With the aid of HPLC, the content of uncomplexed hydrocortisone in the solution was determined.

8) Parallel to this, 1 g of an uncoated material was treated completely identically as the control.

Result

While the hydrocortisone content in the measuring flask in the control experiment with untreated cotton material was unchanged at 1.3 mg, it fell after immersion of the treated substance to 0.77 mg. It could thus be shown that the cavity of the cyclodextrin was still available even after binding to cotton.

EXAMPLE 50

Coating of cotton material with MCT-βCD 0.4

1) 1 g of cotton material (style 407, see Example 21) was coated with MCT-β-CD 0.4 analogously to Example 48 by single immersion in 10% MCT-β-CD (1st coating). The hydrocortisone test was then carried out.

2) The material was washed and rinsed in a washing machine in a 70° C. washing program using a customary detergent.

3) The hydrocortisone test was then carried out again analogously to Example 49.

4) Items 2) and 3) were repeated again.

5) After the third wash, the cotton material was again loaded with MCT-β-CD analogously to item 1). Items 2), 3) and 4) were then repeated.

6) The cotton material was once more loaded with MCT-β-CD again after the third wash analogously to item 1). Items 2), 3) and 4) were then repeated.

7) Parallel to this, 1 g of an uncoated material was treated completely identically as a control.

The following table summarizes the results

|  | Hydrocortisone content of the solution | Hydrocortisone content of the solution after the first washing | Hydrocortisone content of the solution after the second washing | Hydrocortisone content of the solution after the third washing |
|---|---|---|---|---|
| Content of the test solution | 1.75 mg | 1.75 mg | 1.75 mg | 1.75 mg |
| Control experiment (untreated cotton) | 1.75 mg | 1.75 mg | 1.75 mg | 1.75 mg |
| Coating once with MCT-β-CD | 1.30 mg | 1.35 mg | 1.30 mg | 1.30 mg |
| Coating twice with MCT-β-CD | 1.00 mg | 0.95 mg | 1.0 mg | 1.0 mg |
| Coating three times with MCT-β-CD | 0.65 mg | 0.70 mg | 0.75 mg | 0.65 mg |

Result

By means of this experiment it could be shown that the finishing of the substance with MCT-β-CD is washfast and that the covalently bonded cyclodextrin can be freshly loaded again and again with a foreign substance.

EXAMPLE 51

Application of the fragrance Frescolat ML to an MCT-coated cotton fabric 1) 1 g of cotton material (style 407, see Example 21) was coated with 5.5% MCT-β-CD. To this end, the substance was immersed in a 20% aqueous MCT-β-CD 0.4 solution analogously to Example 48, the moisture was removed, and the material was fixed, washed and dried.

2) The coated material was then placed on a clock glass in a desiccator. Next to it were placed a crystallizing dish containing 10 ml of water and a second clock glass containing 250 mg of Frescolat ML.

3) The desiccator was closed and placed in a drying oven at 50° C. for 16 h.

4) The desiccator was then allowed to come to room temperature, and the slightly damp material was taken out and dried at room temperature.

5) The material was then heated at 100° C. in order to remove uncomplexed Frescolat ML.

Result

The dry cotton material has no odor. If, however, it is somewhat dampened, the herbal, decidedly minty note of the Frescolat ML is immediately clearly discernible.

6) In order to determine the content of Frescolat ML quantitatively, the material was covered in a flask with 110 ml of water and subjected for a total of 150 min to a liquid/liquid extraction with 50 ml of hexane.

7) The cooled hexane phase was transferred to a 100 ml measuring flask and made up to the mark with hexane. The 35 content of Frescolat ML was then determined by means of gas chromatography.

Result

A total of 2.834 mg of Frescolat ML were complexed on the material.

EXAMPLE 52

Application of the fragrance Frescolat ML to an MCT coated cotton fabric 1) 1 g of cottoil material (style 407, see Example 21) was coated with 5.5% MCT-β-CD. To this end, the substance was immersed analogously to Example 48 in a 20% aqueous MCT-β-CD 0.4 solution, the moisture was removed, and the material was fixed, washed and dried.

2) The coated material was then immersed in water and well squeezed off. The only slightly damp material was then placed in a desiccator. Next to it was placed a second clock glass containing 250 mg of Frescolat ML.

3) The desiccator was closed and placed in a drying oven at 50° C. for 16 h.

4) The desiccator was then allowed to come to room temperature, and the slightly damp material was taken out and dried at room temperature.

5) The material was then heated at 100° C. in order to remove uncomplexed Frescolat ML.

Result

The dry cotton material has no odor. If, however, it is somewhat dampened, the herbal, decidedly minty note of the Frescolat ML is immediately clearly discernible.

6) In order to determine the content of Frescolat ML quantitatively, the material was covered in a flask with 110 ml of water and subjected for a total of 150 min to a liquid/liquid extraction with 50 ml of hexane for a total of 150 min.

7) The cooled hexane phase was transferred to a 100 ml measuring flask and made up to the mark with hexane. The content of Frescolat ML was then determined by means of gas chromatography.

Result

A total of 3.481 mg of Frescolat ML was completed on the substance.

While several embodiments of the present invention have been shown and described, it is to be understood that many changes and modifications may be made thereunto without departing from the spirit and scope of the invention as defined in the appended claims.

What is claimed is:

1. A reactive cyclodextrin derivative which contains covalently bound at least one nitrogen-containing heterocycle having at least one electrophilic center;

wherein electrophilic centers are identical or different and are carbon atoms to which is covalently bonded substituent selected from the group consisting of halogen, F, Cl, ammonium, trialkylammonium, substituted pyridinium and unsubstituted pyridinium.

2. A solution comprising
   a solvent containing a cyclodextrin derivative as claimed in claim 1, which solution has a pH from 7 to 9.

3. A composition comprising
   a cyclodextrin derivative as claimed in claim 1 bonded to a surface.

4. A selective separating medium for chromatography comprising a separating medium which contains a composition as claimed in claim 3.

5. A selective separating medium for chromatography comprising a separating medium which contains a cyclodextrin derivative as claimed in claim 1.

6. A membrane, foil, film, textile or leather to which a cyclodextrin derivative as claimed in claim 1 is covalently bonded.

7. A derivative according to claim 1, wherein the cyclodextrin has a free cavity.

8. A cyclodextrin of the following formula I:

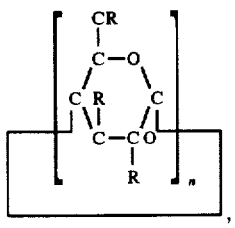
(I)

where R is OH or $OR^1$ or $R^2$ and $R^1$ is a hydrophilic radical which can be identical or different and $R^2$ is at least one covalently bound nitrogen-containing heterocycle which is either linked directly or via a spacer by means of an ether, thioether, ester or amine bond, where the spacer is an alkyl or hydroxyalkyl radical having 1–12 carbon atoms, which is bonded to the anhydroglucose via an ether, thioether, ester or amine bond and said nitrogen-containing heterocycle having at least one electrophilic center; and wherein electrophilic centers are identical or different and are carbon atoms to which is covalently bonded a substituent selected from the group consisting of halogen, F, Cl, ammonium, trialkylammonium, substituted pyridinium and unsubstituted pyridinium; and n is 6, 7, or 8.

9. A cyclodextrin derivative as claimed in claim 8, wherein $R^1$ is identical or different and is methyl, ethyl, n-propyl, i-propyl, n-butyl or i-butyl, $C_2$–$C_6$-hydroxyalkyl, $C_3$–$C_6$-oligohydroxyalkyl, $C_1$–$C_4$-carboxyalkyl, in the form of the free acid or as an alkali metal salt, acetyl, propionyl, butyryl, sulfate, $C_1$–$C_4$-sulfonylalkyl, in the form of the free acid or as an alkali metal salt, $C_2$–$C_4$-carboxyhydroxyalkyl in the form of the free acid or as an alkali metal salt, $C_2$–$C_4$-sulfonylhydroxyalkyl in the form of free acid or as an alkali metal salt, and oxalyl, malonyl, succinyl, glutaryl or adipyl in the form of the free acid or as an alkali metal salt, and $R^2$ is identical or different and is —$R^3_m$—$(CHR^4)_o$—$R^5$—$R^6$, where $R^3$ is identical or different and is O,

S, NH, or $NR^7$ and $R^7$ is identical or different and is $C_1$–$C_6$-alkyl and $R^4$ is identical or different and is H or OH and $R^5$ is NH, $NR^7$, S, O or

and $R^6$ if $R^5$ is NH, $NR^7$, S or O, is either

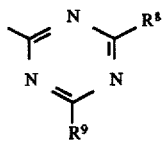

where $R^8$ and $R^9$ are identical or different and are halogen or $R^8$ is $NR^{10}R^{11}$, OH, Oalkali metal, $OR^7$, $O(i-C_3H_6)$ $OCH_2CH_2OCH_3$ or $SO_3H$ and $R^9$ is halogen, Cl, F, or an ammonium substituent, trialkylammonium, or a substituted pyridinium or unsubstituted pyridinium substituent, or is

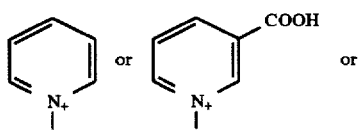

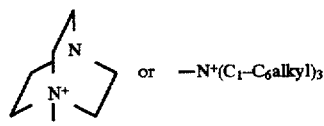

and $R^{10}$ is hydrogen or an aliphatic radical, a $C_1$–$C_4$-alkyl radical which can be substituted by $OCH_3$, $OC_2H_5$, COOH, $OSO_3H$, $SO_3H$, $OCH_2CH_2SO_2CH_2CH_2OSO_3H$, $OCH_2CH_2SO_2CH=CH_2$, $OCH_2CH_2SO_2CH_2CH_2Cl$, $SO_2CH_2CH_2OSO_3H$, $SO_2CH=CH_2$, or a cycloaliphatic radical, a 5- to 6-membered cycloalkyl radical, or araliphatic radical, or a radical of the formula

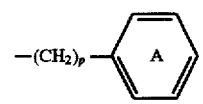

where p=1–4 and the radical A can be substituted, by Cl, $NO_2$, COOH, $SO_3H$, $CH_3$, $OCH_3$, $SO_2CH_2CH_2OSO_3H$, $SO_2CH=CH_2$, $CH_2SO_2CH_2CH_2OSO_3H$, $CH_2SO_2CH=CH_2$, and $R^{11}$ has the meanings mentioned for $R^{10}$ or is phenyl a substituted phenyl radical, or a phenyl radical substituted by Cl, $NO_2$, COOH, $SO_3H$, $CH_3$, $OCH_3$, $SO_2CH_2CH_2OSO_3H$, $SO_2CH=CH_2$, $CH_2SO_2CH_2CH_2OSO_3H$, $CH_2SO_2CH=CH_2$ or R⁶ is

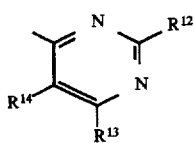

where
R¹², R¹³, and R¹⁴ are identical or different and are halogen,
or R⁶ if R⁵ is

is

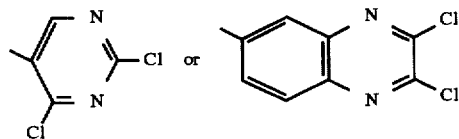

and
o is an integer from 0 to 12 and
m is 0 or 1, where
for o=0, m=0 also applies.

10. A solution comprising
a solvent containing a cyclodextrin derivative as claimed in claim 8, which solution has a pH from 7 to 9.

11. A composition comprising
a cyclodextrin derivative as claimed in claim 8 bonded to a surface.

12. A selective separating medium for chromatography comprising
a separating medium which contains a composition as claimed in claim 11.

13. A selective separating medium for chromatography comprising
a separating medium which contains a cyclodextrin derivative as claimed in claim 8.

14. A membrane, foil, film, textile or leather to which a cyclodextrin derivative as claimed in claim 8 is covalently bonded.

15. The cyclodextrin of claim 8,
wherein the nitrogen-containing heterocycle includes at least one substituent selected from the group consisting of halogen and ammonium.

16. A cyclodextrin derivative selected from the group consisting of 2,4-dichloro-1,3,5-triazinylcyclodextrin, 2-chloro-4-hydroxy-1,3,5-triazinylcyclodextrin, the sodium salt of 2-chloro-4-hydroxy-1,3,5-triazinylcyclodextrin, 2-fluoro-4-hydroxy-1,3,5-triazinylcyclodextrin, the sodium salt of 2-fluoro-4-hydroxy-1,3,5-triazinylcyclodextrin, 2,4,5-trichloropyrimidylcyclodextrin, 5-chloro-2,4-difluoropyrimidylcyclodextrin, 6-(2,3-dichloro)-quinoxalinylcyclodextrin, 5-(2,4-dichloro)pyrimidinyl-cyclodextrin, 2-amino-4-chloro-1,3,5-triazinyl-cyclodextrin, 2-chloro-4-ethylamino-1,3,5-triazinyl-cyclodextrin, 2-chloro-4-diethylamino-1,3,5-triazinyl-cyclodextrin, and 2-chloro-4-methoxy-1,3,5-triazinyl-cyclodextrin.

* * * * *